(12) United States Patent
Pisklak et al.

(10) Patent No.: US 10,961,428 B1
(45) Date of Patent: Mar. 30, 2021

(54) LOW-PORTLAND EXTENDED LIFE SLURRIES FOR USE IN OILWELL CEMENTING

(71) Applicant: Halliburton Energy Services, Inc., Houston, TX (US)

(72) Inventors: Thomas Jason Pisklak, Cypress, TX (US); Claudia Carmen Pineda, Houston, TX (US); Ronnie Glen Morgan, Waunka, OK (US); James Robert Benkley, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/732,936

(22) Filed: Jan. 2, 2020

(51) Int. Cl.
| | |
|---|---|
| C09K 8/467 | (2006.01) |
| C04B 28/04 | (2006.01) |
| C04B 24/18 | (2006.01) |
| C04B 24/26 | (2006.01) |
| E21B 33/14 | (2006.01) |
| C04B 40/06 | (2006.01) |
| E21B 47/005 | (2012.01) |
| C04B 111/00 | (2006.01) |

(Continued)

(52) U.S. Cl.
CPC .............. *C09K 8/467* (2013.01); *C04B 24/18* (2013.01); *C04B 24/2641* (2013.01); *C04B 28/04* (2013.01); *C04B 40/0658* (2013.01); *E21B 33/14* (2013.01); *E21B 47/005* (2020.05); *C04B 2103/10* (2013.01); *C04B 2103/22* (2013.01); *C04B 2111/00146* (2013.01)

(58) Field of Classification Search
None
See application file for complete search history.

(56) References Cited

U.S. PATENT DOCUMENTS

| | | | |
|---|---|---|---|
| 4,047,567 A | 9/1977 | Childs et al. | |
| 5,613,558 A * | 3/1997 | Dillenbeck, III | ..... C04B 22/068 |
| | | | 106/720 |

(Continued)

FOREIGN PATENT DOCUMENTS

| | | |
|---|---|---|
| WO | 97-21637 | 6/1997 |
| WO | 2010-116143 | 10/2010 |

(Continued)

OTHER PUBLICATIONS

International Search Report and Written Opinion for Application No. PCT/US2020/015244, dated Sep. 24, 2020.

*Primary Examiner* — Andrew Sue-Ako
(74) *Attorney, Agent, or Firm* — Thomas Rooney; C. Tumey Law Group PLLC

(57) ABSTRACT

A method of preparing a cement may include: defining one or more engineering parameters of a proposed cement slurry; selecting at least: a cement and mass fraction thereof and at least one supplementary cementitious material and mass fraction thereof; a retarder and mass fraction thereof; and a water and mass fraction thereof, such that a slurry formed from the cement, the at least one supplementary cementitious material, the retarder, and the water meets at least one of the one or more engineering parameters and has a property of being capable of remaining in a pumpable fluid state for a period of about 1 day or greater at a temperature of about 80° F. in quiescent storage; and preparing the slurry.

17 Claims, 10 Drawing Sheets

(51) Int. Cl.
*C04B 103/22* (2006.01)
*C04B 103/10* (2006.01)

(56) References Cited

U.S. PATENT DOCUMENTS

| | | |
|---|---|---|
| 6,907,928 B2 | 6/2005 | Di Lullo Arias et al. |
| 8,851,173 B2 | 10/2014 | Brothers et al. |
| 2009/0200029 A1* | 8/2009 | Roddy .................. C04B 28/021 166/293 |
| 2017/0001911 A1* | 1/2017 | Pisklak .................. C04B 28/18 |
| 2017/0306211 A1* | 10/2017 | Pisklak .................. C04B 28/04 |

FOREIGN PATENT DOCUMENTS

| | | |
|---|---|---|
| WO | 2018-156123 | 8/2018 |
| WO | 2019-156691 | 8/2019 |

* cited by examiner

LOW-PORTLAND EXTENDED LIFE SLURRIES FOR USE IN OILWELL CEMENTING

BACKGROUND

Embodiments relate to subterranean cementing operations and, in certain embodiments, to extended-life cement slurries and methods of using extended-life cement slurries in subterranean formations.

Cement compositions are used in a variety of subterranean operations. For example, in subterranean well construction, a pipe string (e.g., casing, liners, expandable tubulars, etc.) can be run into a wellbore and cemented in place. The process of cementing the pipe string in place is commonly referred to as "primary cementing." In a typical primary cementing method, a cement composition can be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, extended-life cement slurries have been used. Extended-life cement slurries are characterized by remaining in a pumpable fluid state for at least about one day (e.g., at least about 7 days, about 2 weeks, about 2 years or more) at room temperature (e.g., about 80° F.) in quiescent storage. When desired for use, the extended-life cement slurries should be capable of being activated whereby reasonable compressive strengths are developed. For example, a cement set activator may be added to an extended-life cement slurries to form an activated composition whereby the activated composition sets into a hardened mass. Among other things, the extended-life cement slurries may be suitable for use in wellbore applications, for example, where it is desired to prepare the cement slurries in advance. This may allow, for example, the cement slurries to be stored prior to its use. In addition, this may allow, for example, the cement slurries to be prepared at a convenient location and then transported to the job site. Accordingly, capital expenditures may be reduced due to a reduction in the need for on-site bulk storage and mixing equipment. This may be particularly useful for offshore cementing operations where space onboard the vessel may be limited.

While extended-life cement slurries have been developed heretofore, challenges may exist with their successful use in subterranean cementing operations. For example, extended-life cement slurries developed hereto may require specific formulations of natural glasses and additives to remain in a pumpable fluid state. Furthermore, such specific formulations may be difficult to prepare, natural glasses from one region may differ from natural glasses that may be sourced from a different region, thereby potentially requiring extended-life cement compositions to be tailored to available materials in a region. Additional complexity may arise from the strong inorganic acids relied upon to extend slurry life, which in turn may require strong activators to overcome the retarding effects of the strong inorganic acids. Finally, there may be challenges to formulate an extended-life slurry which forms the required compressive strength (e.g. 24 hour compressive strength) at lower temperatures, such as, lower than about 140° F. (60° C.) for some extended-life slurries.

BRIEF DESCRIPTION OF THE DRAWINGS

These drawings illustrate certain aspects of some of the embodiments of the present method and should not be used to limit or define the method.

DETAILED DESCRIPTION

Figure 1:
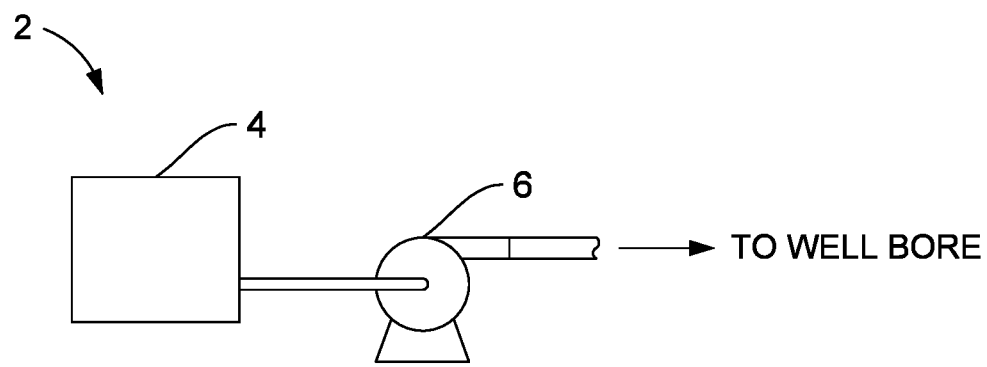
FIG. 1 illustrates a system for the preparation and delivery of an extended-life cement composition to a wellbore in accordance with certain embodiments.

Disclosed herein are examples, which may relate to subterranean cementing operations and, in certain instances, to extended-life cement slurries and methods of using extended-life cement compositions in slurry formulations. Extended-life cement slurries may be designed utilizing cement slurry design techniques disclosed herein. The disclosed slurry design techniques may allow cement slurries to be formulated, which do not set to form a hardened mass for an extended period of time. Extended-life cement slurries are characterized by remaining in a pumpable fluid state for at least about one day (e.g., at least about 7 days, about 2 weeks, about 2 years or more) at room temperature (e.g., about 80° F.) in quiescent storage. An extended-life cement slurry may be activated at a later time to form an activated slurry, which may then form a hardened mass.

Conventional cement compositions typically include Portland cement and water. When first mixed, the water and Portland cement constitute a paste where water surrounds all the individual grains of Portland cement to make a plastic mixture. A chemical reaction called hydration takes place between the water and Portland cement which causes the composition to change from a plastic state to a solid state in a period of about two hours at room temperature (e.g. about 80° F.). After about two hours, the cement develops a measurable compressive strength, which may increase to a final compressive strength over a period of weeks. After the initial mixing of the water and cement, unmodified Portland cement typically remains pumpable for a period of about one hour before becoming too viscous to pump. The pump time of Portland cement may be modified using cement retarders, which are believed to slow the hydration reaction thereby allowing the cement composition to remain in a pumpable fluid state for longer. Cement retarders can typically be used extend the pump time of cements for a period of several hours. While cement retarders may allow for pump times to be extended, the hydration reaction is still occurring within the cement slurry, which will ultimately lead to the slurry to form a hardened mass, thus limiting the effective time that a cement may be extended. Inclusion of a relatively larger amount of cement retarder in a cement composition may extend the pump time beyond several hours but typically also results in a set cement that does not have the desired physical properties such as compressive strength. As such, there are upper limits on the amount of time that Portland cement based slurries can be extended utilizing cement retarders before the retarder concentration interferes with the hydration of the Portland cement.

In contrast, extended-life cement slurries may remain in a pumpable fluid state for a longer period of time than retarded Portland cements while retaining the ability to be activated and set to form a hardened mass with desired physical properties such as compressive strength. While the extended-life cement slurries described herein may contain Portland cement as well as some cement retarders which may be found in a conventional Portland cement slurry, Portland cement slurries do not have the same physical properties as the extended-life cement slurries described herein. The design process for extended-life cement slurries imparts unique characteristics, such as the ability to remain in a pumpable fluid state for an extended period of time, to the extended-life cement slurries by choosing cement components with physicochemical properties that promote desired physical properties.

Extended-life cement compositions described herein may generally include a hydraulic cement, one or more supplementary cementitious materials, a retarder, and water. A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include, but are not limited to, Portland cements, pozzolana cements, gypsum cements, high alumina content cements, silica cements, and any combination thereof. In certain examples, the hydraulic cement may include a Portland cement. In some examples, the Portland cements may include Portland cements that are classified as Classes A, C, H, and G cements according to American Petroleum Institute, *API Specification for Materials and Testing for Well Cements*, API Specification 10, Fifth Ed., Jul. 1, 1990. In addition, hydraulic cements may include cements classified by American Society for Testing and Materials (ASTM) in C150 (Standard Specification for Portland Cement), C595 (Standard Specification for Blended Hydraulic Cement) or C1157 (Performance Specification for Hydraulic Cements) such as those cements classified as ASTM Type I, II, or III. The hydraulic cement may be included in the extended-life cement composition in any amount suitable for a particular composition. Without limitation, the hydraulic cement may be included in the extended-life cement slurries in an amount in the range of from about 10% to about 80% by weight of dry blend in the extended-life cement composition. For example, the hydraulic cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the extended-life cement compositions.

The water may be from any source provided that it does not contain an excess of compounds that may undesirably affect other components in the extended-life cement compositions. For example, an extended-life cement composition may include fresh water or saltwater. Saltwater generally may include one or more dissolved salts therein and may be saturated or unsaturated as desired for a particular application. Seawater or brines may be suitable for use in some examples. Further, the water may be present in an amount sufficient to form a pumpable slurry. In certain examples, the water may be present in the extended-life cement composition in an amount in the range of from about 33% to about 200% by weight of the cementitious materials. For example, the water cement may be present in an amount ranging between any of and/or including any of about 33%, about 50%, about 75%, about 100%, about 125%, about 150%, about 175%, or about 200% by weight of the cementitious materials. The cementitious materials referenced may include all components which contribute to the compressive strength of the extended-life cement composition such as the hydraulic cement and supplementary cementitious materials, for example.

As mentioned above, the extended-life cement composition may include supplementary cementitious materials. The supplementary cementitious material may be any material that contributes to the compressive strength of the extended-life cement composition. Some supplementary cementitious materials may include, without limitation, fly ash, blast furnace slag, silica fume, pozzolans, kiln dust, and clays, for example. Although only some supplementary cementitious materials are disclosed herein, one of ordinary skill in the art, with the benefit of this disclosure, should be able to readily recognize if a material may be suitable to include in an extended-life cement composition as a supplementary cementitious material.

The extended-life cement composition may include kiln dust as a supplementary cementitious material. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, lime stone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. A cement kiln dust may be added to the extended-life cement composition prior to, concurrently with, or after activation. Cement kiln dust may include a partially calcined kiln feed which is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$. The CKD and/or lime kiln dust may be included in examples of the extended-life cement composition in an amount suitable for a particular application.

In some examples, the extended-life cement composition may further include one or more of slag, natural glass, shale, amorphous silica, or metakaolin as a supplementary cementitious material. Slag is generally a granulated, blast furnace by-product from the production of cast iron including the oxidized impurities found in iron ore. The extended-life cement may further include perlite. Perlite is an ore and generally refers to a naturally occurring volcanic, amorphous siliceous rock including mostly silicon dioxide and aluminum oxide. The perlite may be expanded and/or unexpanded as suitable for a particular application. The expanded or unexpanded perlite may also be ground, for example. The extended-life cement may further include shale. A variety of shales may be suitable, including those including silicon, aluminum, calcium, and/or magnesium. Examples of suitable shales include vitrified shale and/or calcined shale.

In some examples, the extended-life cement composition may further include amorphous silica as a supplementary cementitious material. Amorphous silica is a powder that may be included in embodiments to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process In some examples, the extended-life cement composition may further include a variety of fly ashes as a supplementary cementitious material which may include fly ash classified as Class C, Class F, or Class N fly ash according to American Petroleum Institute, API Specification for Materials and Testing for Well Cements, API Specification 10, Fifth Ed., Jul. 1, 1990. In some examples, the extended-life cement composition may further include zeolites as supplementary cementitious materials. Zeolites are generally porous alumino-silicate minerals that may be either natural or synthetic. Synthetic zeolites are based on the same type of structural cell as natural zeolites and may comprise alumino-silicate hydrates. As used herein, the term "zeolite" refers to all natural and synthetic forms of zeolite.

Where used, one or more of the aforementioned supplementary cementitious materials may be present in the extended-life cement composition. For example, without limitation, one or more supplementary cementitious materials may be present in an amount of about 0.1% to about 80% by weight of the extended-life cement composition. For example, the perlite may be present in an amount ranging between any of and/or including any of about 0.1%, about 10%, about 20%, about 30%, about 40%, about 50%, about 60%, about 70%, or about 80% by weight of the extended-life cement.

In some examples, the extended-life cement composition may further include hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in examples of the extended-life cement composition, for example, to form a hydraulic composition with the supplementary cementitious components. For example, the hydrated lime may be included in a supplementary cementitious material-to-hydrated-lime weight ratio of about 10:1 to about 1:1 or 3:1 to about 5:1. Where present, the hydrated lime may be included in the set extended-life cement composition in an amount in the range of from about 10% to about 100% by weight of the extended-life cement composition, for example. In some examples, the hydrated lime may be present in an amount ranging between any of and/or including any of about 10%, about 20%, about 40%, about 60%, about 80%, or about 100% by weight of the extended-life cement composition. In some examples, the cementitious components present in the extended-life cement composition may consist essentially of one or more supplementary cementitious materials and the hydrated lime. For example, the cementitious components may primarily comprise the supplementary cementitious materials and the hydrated lime without any additional components (e.g., Portland cement, fly ash, slag cement) that hydraulically set in the presence of water.

Other additives suitable for use in subterranean cementing operations also may be included in embodiments of the extended-life cement composition. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the extended-life cement composition after storing but prior to the placement of an extended-life cement composition into a subterranean formation. In some examples, the extended-life cement composition may further include a dispersant. Examples of suitable dispersants include, without limitation, sulfonated-formaldehyde-based dispersants (e.g., sulfonated acetone formaldehyde condensate) or polycarboxylated ether dispersants. In some examples, the dispersant may be included in the extended-life cement composition in an amount in the range of from about 0.01% to about 5% by weight of the cementitious materials. In specific examples, the dispersant may be present in an amount ranging between any of and/or including any of about 0.01%, about 0.1%, about 0.5%, about 1%, about 2%, about 3%, about 4%, or about 5% by weight of the cementitious materials.

In some examples, the extended-life cement composition may further include a set retarder. A broad variety of set retarders may be suitable for use in the extended-life cement compositions. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. Generally, the set retarder may be present in the extended-life cement composition in an amount sufficient to delay the setting for a desired time. In some examples, the set retarder may be present in the extended-life cement composition in an amount in the range of from about 0.01% to about 10% by weight of the cementitious materials. In specific examples, the set retarder may be present in an amount ranging between any of and/or including any of about 0.01%, about 0.1%, about 1%, about 2%, about 4%, about 6%, about 8%, or about 10% by weight of the cementitious materials.

Cement compositions generally should have a density suitable for a particular application. By way of example, the extended-life cement composition may have a density in the range of from about 4 pounds per gallon ("lbm/gal") to about 20 lbm/gal. In certain embodiments, the extended-life cement composition may have a density in the range of from about 8 lbm/gal to about 17 lbm/gal or about 8 lbm/gal to about 14 lbm/gal. Examples of the extended-life cement compositions may be foamed or unfoamed or may comprise other means to reduce their densities, such as hollow microspheres, low-density elastic beads, or other density-reducing additives known in the art. In examples, the density may be reduced after storing the composition, but prior to placement in a subterranean formation.

As previously mentioned, the extended-life cement composition may have a property of being able to be stored in a pumpable fluid state for at least one day (e.g., at least about 1 day, about 2 weeks, about 2 years or more) at room temperature (e.g., about 80° F.) in quiescent storage. For example, the extended-life cement compositions may remain in a pumpable fluid state for a period of time from about 1 day to about 7 days or more. In some examples, the extended-life cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

When desired for use, examples of the extended-life cement compositions may be activated (e.g., by combination with an activator) to set into a hardened mass. The term "cement set activator" or "activator", as used herein, refers to an additive that activates an extended-life cement composition such that the extended life cement composition sets to form a hardened mass. An extended-life cement composition comprising an activator may be referred to as an activated cement slurry. As discussed above, a feature of extended-life cement compositions is that the hydration reaction that causes the extended-life cement composition to set may be slowed to a point such that the extended-life cement composition can remain in a pumpable fluid state for an extended period of time. While some activators may also have accelerating properties that increase the rate of reaction, a conventional Portland cement accelerator may not always be an activator for the extended-life cement compositions. By way of example, the extended-life cement composition may be activated to form a hardened mass in a time period in the range of from about 1 hour to about 12 hours. Alternatively, the extended-life cement composition may set to form a hardened mass in a time period ranging between any of and/or including any of about 1 day, about 2 days, about 4 days, about 6 days, about 8 days, about 10 days, or about 12 days.

In some examples, a cement set activator may be added to the extended-life cement composition when it is desired to set the extended-life cement composition to form a hardened mass. Examples of suitable cement set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the extended-life cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In some examples, the activator may be provided and added to the extended-life cement compositions as a liquid additive, such as, a liquid additive including a monovalent salt, a polyphosphate, and optionally a dispersant.

Some examples may include a cement set activator including a combination of a monovalent salt and a polyphosphate. The monovalent salt and the polyphosphate may be combined prior to addition to the extended-life cement composition or may be separately added to the extended-life cement composition. The monovalent salt may be any salt that dissociates to form a monovalent cation, such as sodium and potassium salts. Specific examples of suitable monovalent salts include potassium sulfate and sodium sulfate. A variety of different polyphosphates may be used in combination with the monovalent salt for activation of the extended-life cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator includes a combination of sodium sulfate and sodium hexametaphosphate. Because of the unique chemistry of polyphosphates, polyphosphates may be used as a cement set activator for examples of the extended-life cement compositions disclosed herein. The ratio of the monovalent salt to the polyphosphate may range, for example, from about 5:1 to about 1:25 or from about 1:1 to about 1:10. Examples of the cement set activator may include the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some examples, the combination of the monovalent salt and the polyphosphate may be mixed with a dispersant and water to form a liquid additive for activation of an extended-life cement composition. Examples of suitable dispersants include, without limitation, the previously described dispersants, such as sulfonated-formaldehyde-based dispersants and polycarboxylated ether dispersants. One example of a suitable sulfonated-formaldehyde-based dispersant is a sulfonated acetone formaldehyde condensate.

The cement set activator may be added to examples of the extended-life cement composition in an amount sufficient to induce the extended-life cement composition to set into a hardened mass. In certain examples, the cement set activator may be added to the extended-life cement composition in an amount in the range of about 0.1% to about 20% by weight of the cementitious materials. In specific embodiments, the cement set activator may be present in an amount ranging between any of and/or including any of about 0.1%, about 1%, about 5%, about 10%, about 15%, or about 20% by weight of the cementitious materials. In some examples, a cement activator may not be required such as in high temperature applications where the extended-life cement composition may thermally activate and set to form a hardened mass without adding an activator.

In some examples, the extended-life cement compositions may set to have a desirable compressive strength after activation. Compressive strength is generally the capacity of a material or structure to withstand axially directed pushing forces. The compressive strength may be measured at a specified time after the extended-life cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the extended-life cement compositions may develop a 24-hour compressive strength in the range of from about 50 psi to about 5000 psi, alternatively, from about 100 psi to about 4500 psi, or alternatively from about 500 psi to about 4000 psi. In some examples, the extended-life cement composition may develop a compressive strength in 24 hours of at least about 50 psi, at least about 100 psi, at least about 500 psi, or more. In some examples, the compressive strength values may be determined using destructive or non-destructive methods at a temperature ranging from 100° F. to 200° F.

The extended-life cement composition may have desirable thickening times after activation. Thickening time typically refers to the time a fluid, such as the extended-life cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement compositions may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

Referring now to FIG. 1, the preparation of an extended-life cement composition in accordance with example embodiments will now be described. FIG. 1 illustrates a system 2 for the preparation of an extended-life cement composition and subsequent delivery of the composition to a wellbore in accordance with certain embodiments. The extended-life cement composition may be prepared according to any method disclosed herein such that the extended-life cement composition has the property of being able to remain in a pumpable fluid state for an extended period of time. As shown, the extended-life cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the lime/settable material with the water as it is being pumped to the wellbore. In extended-life embodiments, a re-circulating mixer and/or a batch mixer may be used to mix the extended-life cement composition, and the activator may be added to the mixer as a powder prior to pumping the cement composition downhole. Additionally, batch mixer type units for the slurry may be plumbed in line with a separate tank containing a cement set activator. The cement set activator may then be fed in-line with the slurry as it is pumped out of the mixing unit.

Figure 2:
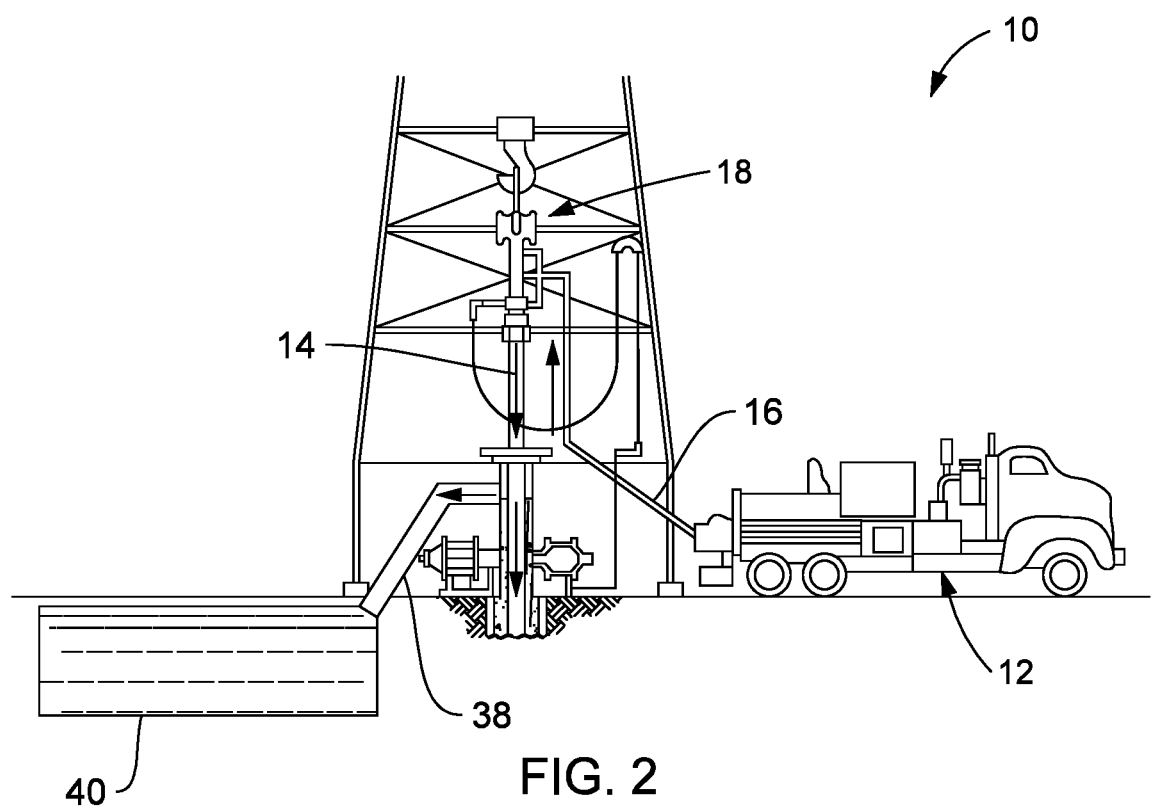
FIG. 2 illustrates surface equipment that may be used in the placement of an extended-life cement composition in a wellbore in accordance with certain embodiments.

An example technique for placing an extended-life cement composition into a subterranean formation will now be described with reference to FIGS. 2 and 3. FIG. 2 illustrates surface equipment 10 that may be used in placement of an extended-life cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump an extended-life cement composition 14 through a feed pipe 16 and to a cementing head 18 which conveys the extended-life cement composition 14 downhole.

Figure 3:
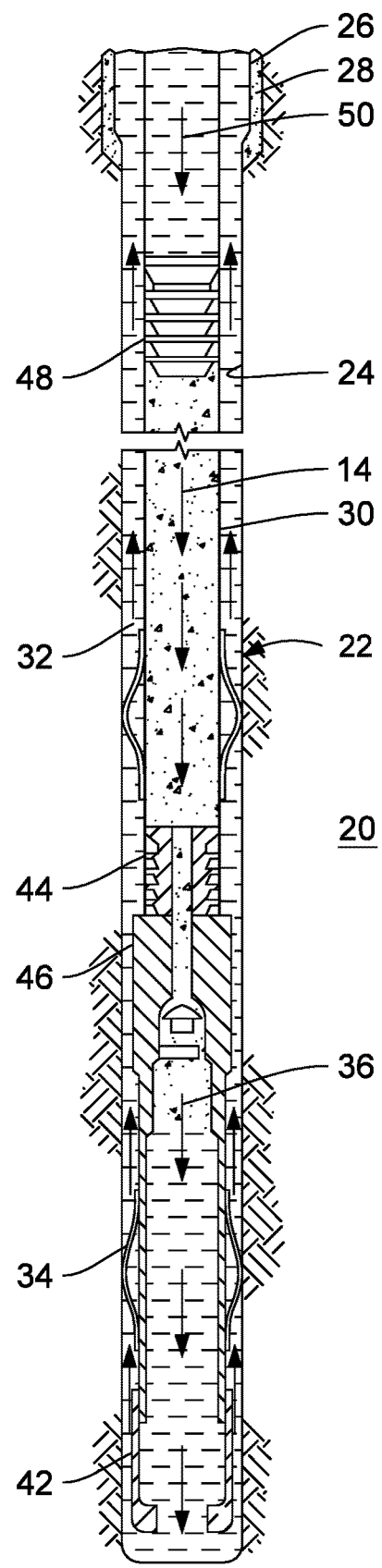
FIG. 3 illustrates the placement of an extended-life cement composition into a wellbore annulus in accordance with certain embodiments.

Turning now to FIG. 3, the extended-life cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 3, the extended-life cement composition 14 may be pumped down the interior of the casing 30. The extended-life cement composition 14 may be allowed to flow down the interior of the casing 30 through the casing shoe 42 at the bottom of the casing 30 and up around the casing 30 into the wellbore annulus 32. The extended-life cement composition 14 may be allowed to set in the wellbore annulus 32, for example, to form a cement sheath that supports and positions the casing 30 in the wellbore 22. While not illustrated, other techniques may also be utilized for introduction of the extended-life cement composition 14. By way of example, reverse circulation techniques may be used that include introducing the extended-life cement composition 14 into the subterranean formation 20 by way of the wellbore annulus 32 instead of through the casing 30.

As it is introduced, the extended-life cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2. Referring again to FIG. 3, a bottom plug 44 may be introduced into the wellbore 22 ahead of the extended-life cement composition 14, for example, to separate the extended-life cement composition 14 from the fluids 36 that may be inside the casing 30 prior to cementing. After the bottom plug 44 reaches the landing collar 46, a diaphragm or other suitable device should rupture to allow the extended-life cement composition 14 through the bottom plug 44. In FIG. 3, the bottom plug 44 is shown on the landing collar 46. In the illustrated embodiment, a top plug 48 may be introduced into the wellbore 22 behind the extended-life cement composition 14. The top plug 48 may separate the extended-life cement composition 14 from a displacement fluid 50 and also push the extended-life cement composition 14 through the bottom plug 44.

Figure 4:
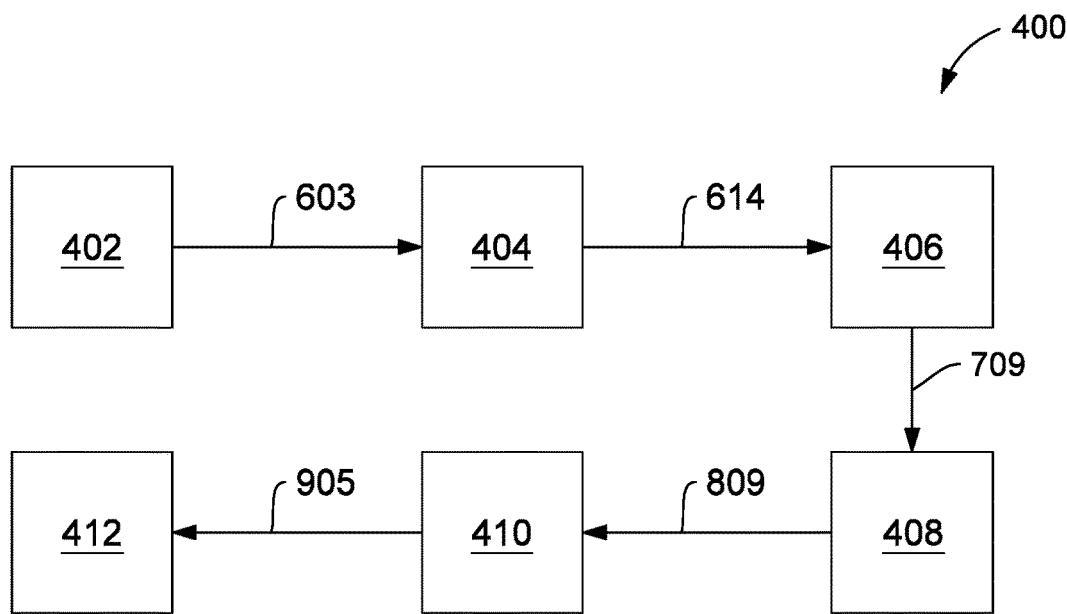
FIG. 4 is a flowchart illustrating an example method for designing an extended-life cement composition.

A method of preparing an extended-life cement composition will now be discussed in detail. FIG. 4 is a flow chart outlining the major steps in method 400 for preparing an extended-life cement. The method includes six principal steps. In step 402, the engineering parameters of the extended-life cement composition are defined. Some engineering parameters may include wellbore temperature, wellbore pressure, and compressive strength requirement, for example. In step 404, a Portland cement and supplementary cementitious materials are selected that will meet the engineering parameters set out in step 402. In step 406, a retarder and concentration thereof are selected that is compatible with the Portland cement selected in step 404 and the engineering parameters set out in step 402. In step 408, the extended-life cement composition is designed for rheological stability. In step 410 an activator and concentration thereof are selected that are compatible with the Portland cement selected in step 404 and meets the engineering parameters set out in step 402. Finally, step 412 includes verifying the compressive strength of the extended-life cement composition to verify the extended-life cement composition meets the engineering parameters set forth in step 402.

Step 402 may include defining the engineering parameters of the extended life cement composition. Typically, at least some of the engineering parameters are set in accordance with the conditions of the wellbore being cemented. For example, bottom hole static temperature and temperature gradient within the wellbore may be defined by logging operations which measure the temperature along a length of the wellbore. Additionally, the density requirements for a wellbore cement may be measured in the same way by measuring bottom hole static pressure and pressure gradient along the wellbore. Some engineering parameters may be defined by a customer, regulatory requirements, or by industry best practices. Some other engineering parameters may include final compressive strength, compressive strength development rate, thickening time, and gelling requirements, for example. Another engineering parameter that may be selected is slurry shelf life. As discussed above, a feature of extended-life cement composition is the property that the extended-life cement slurry can be stored in a pumpable fluid state for an extended period of time. As such, the desired "shelf life" time or shelf life stability or shelf life requirement may be defined as an engineering parameter of the extended-life cement composition. Although only some engineering parameters have been enumerated herein, one of ordinary skill in the art should readily recognize other engineering parameters that may be applicable to any particular cement composition or wellbore where said cement composition is to be placed.

Figure 5:
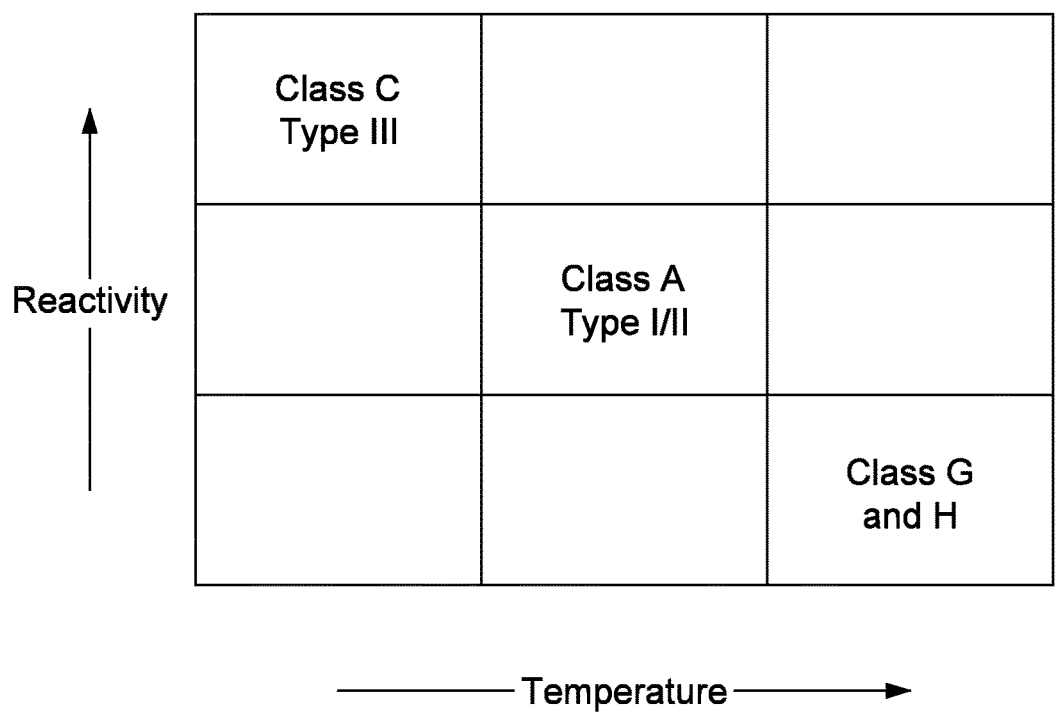
FIG. 5 is graph of reactivity for different classes of Portland cement.

Step 404 may include selecting a Portland cement that meets the engineering parameters set out in step 402. FIG. 5 shows a general trend of reactivity for different classes of Portland cement. Class C or ASTM type III Portland cement generally has a relatively higher reactivity at all temperatures than class A or ASTM type I/II and class G/H. Class A or ASTM type I/II generally has a higher reactivity at all temperatures than class G/H. As such, for a relatively low wellbore temperature, class C or ASTM type III may be required to meet engineering parameters such as rate of compressive strength development, and thickening time, for example as class A or ASTM type I/II and Class G/H may not be reactive enough at lower temperatures. Similarly, for relatively medium temperature wellbore, class A or ASTM type I/II may be selected to balance reactivity with higher temperature. Finally, for relatively higher temperature wellbores, class G/H cement may be selected as the reactivity may be appropriate for the relatively higher temperature where other Portland cements may react too quickly to be placed in the wellbore. In some examples, more than one Portland cement may be selected.

Figure 6:
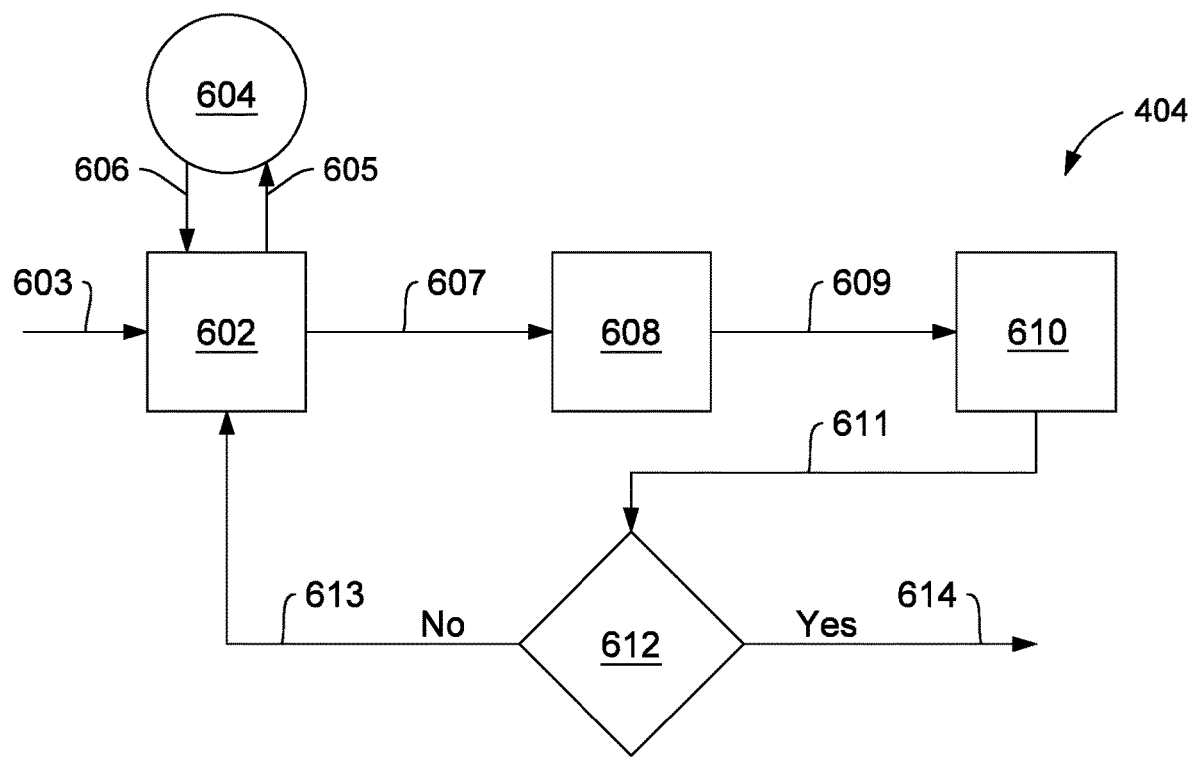
FIG. 6 is a flowchart illustrating an example method of selecting a Portland cement and supplementary cementitious material.

FIG. 6 is a flowchart illustrating a detailed procedure for step 404 for selecting a Portland cement and supplementary cementitious materials to be included in an extended-life cement composition. Step 404 as illustrated in FIG. 6 may begin with selecting a Portland cement in step 602. Step 602 may take as input the engineering parameters determined in step 402 in FIG. 4, show in FIG. 6 as arrow 603. From the input of arrow 603, a first approximation for the correct Portland cement may be determined based at least in part on the temperature defined by the engineering parameters. There may be more than one correct Portland cement that may meet the engineering parameters set for in step 402 based on temperature, however, as will be discussed in detail below, the Portland cement selected may not meet other engineering parameters such as shelf life stability. In step 602, the engineering parameters may be compared against a cement reactivity trend 604 illustrated by arrow 605. Cement reactivity trend 604 may be a reactivity trend such as that illustrated in FIG. 5 or may be any other cement reactivity trend which includes information about reactivity and temperature for various cements. In some examples, the recement reactivity trend may include a correlation of cement reactivity with temperature. Arrow 606 indicates information from cement reactivity trend 604 being transferred back to step 602.

From step 602, the selected Portland cement may be an input to step 608, indicated by arrow 607. In step 608, supplementary cementitious materials may be selected to impart physical and chemical properties to the extended-life cement slurry. A supplementary cementitious material selection matrix is shown in Matrix 1 below. In some examples, a supplementary cementitious material selection matrix may include correlations which may take as input engineering parameters defined above such as wellbore temperature and water to blend ratio and output a supplementary cementitious material appropriate for use based at least in part on the engineering parameters. Additionally, supplementary cementitious materials may be selected based as least in part on reactivity, temperature sensitivity of reactivity, and water requirement. Water requirement is typically defined as the amount of mixing water that is required to be added to a powdered, solid material to form a slurry of a specified consistency. Any of the previously mentioned supplementary cementitious materials may be included in an extended-life cement slurry. The water to blend ratio may be based on the Portland cement and SCM's selected for inclusion in the extended-life cement composition and the density set for in step 402.

Matrix 1

| Wellbore Temperature | High | Select Low Reactive SCM with low WR | Select Low Reactive SCM with medium WR | Select Low Reactive SCM with medium WR |
|---|---|---|---|---|
| | Medium | Select High reactive SCM and Low Reactive SCM and mix 1:2 ratio | Select high reactive SCM and Low Reactive SCM and mix with 1:1 ratio | Select high reactive SCM and Low reactive SCM and mix 2:1 ratio |
| | Low | Select High reactive SCM with low WR | Select High Reactive SCM with medium WR | Select high Reactive SCM with high WR |
| | | Low | Medium | High |
| | | Water to Blend Ratio (blend = Portland plus SCM's) | | |

The supplementary cement components may be analyzed to determine their water requirement by any method. As the water requirement may be the amount of mixing water that is required to be added to a powdered, solid material to form a slurry of a specified consistency, one example technique for determining water requirement holds the consistency and amount of water constant while varying the amount of the solid material. However, techniques may also be applied that vary the amount of the water, the consistency, and/or the amount of solid material in any combination. Water requirement for a supplementary cementitious material may be determined by a process that includes a) preparing a blender (e.g., Waring® blender) with a specified amount of water (e.g., about 100 grams to about 500 grams), b) agitating the water at a specified blender rpm (e.g., 4,000 to 15,000 rpm), c) adding the powdered solid that is being investigated to the water until a specified consistency is obtained, and d) calculating the water requirement based on the ratio of water to solids required to obtain the desired consistency. A specific example for determining water requirement may include, but is not limited to: 1) preparing a blender (e.g., Waring® blender) with a specified amount of water (e.g., about 100 grams to about 500 grams or about 200 grams in one example); 2) agitating the water at a specified blender rpm (e.g., about 4,000 to about 15,000 rpm or about 12,000 rpm in one example); 3) adding a specified amount (e.g., about 1 gram to about 1,000 grams or about 400 grams in one example) of the cement component to the water; 4) observing mixture to determine if a specified consistency is obtained, for example, the cement component can be considered thoroughly wet and mixed if the vortex formed at the surface of the mixture in the blender is about 0 inches (0 mm) to about 2 inch (50 mm) or about 0.004 inches (0.1 mm) to about 1 inch (25 mm); 5) if the desired consistency is not obtained, add more cement component until desired consistency is obtained, for example, the vortex formed in the blender is about the size of a dime; and 6) calculate the water requirement based on the ratio of water to cement component to obtain the desired consistency. In some examples, the specific consistency may be where a vortex at the surface of the mixture in the blender is the size of a dime or about 0.7 in (17.9 mm). Other suitable techniques for determining the water requirement may also be used as will be appreciated by those of ordinary skill in the art.

As is illustrated in the supplementary cementitious material selection matrix of Matrix 1, there may be two general trends to selection of supplementary cementitious materials. First, as the wellbore temperature is increased, a less reactive SCM may be chosen to reduce the reactivity of the extended-life cement composition. Conversely, as the wellbore temperature decreases, a more reactive SCM may be chosen to increase the reactivity of the extended-life cement composition. Second, as the water to cement blend ratio increases from a relatively lower water ratio to a higher water ratio, the water requirement of the SCM may increase to account for the additional water. The amount of water in the slurry may be a function of the density requirement of the cement composition, determined in step 402. In general, water may be less dense than cement and therefore an increased fraction of water yields a less dense cement slurry. As such, the water content of the cement slurry may be a function of required density and the water to blend ratio may be deemed low, medium, or high, depending on the amount of water required to reach the density specified in step 402. There may be a third factor in the SCM selection process where an intermediate reactivity is required due to an intermediate wellbore temperature. In such examples, two SCMs with disparate reactivity may be selected and mixed to form a compound SCM with intermediate reactivity. Additionally, water requirement for the compound SCM may be modulated by selecting SCMs with disparate water requirement that combine to form an intermediate water requirement. In examples where an intermediate reactivity is required and a low water requirement is required, two SCMs with relatively lower water requirement and disparate activities may be selected to form an intermediate reactivity, low water requirement compound SCM. Conversely, in examples where an intermediate reactivity is required and a high water requirement is required, two SCMs with relatively higher water requirement and disparate activities may be selected to form an intermediate reactivity, higher water requirement compound SCM.

Once the SCM or SCMs have been selected, an additional consideration in step 608 may be calculation of lime available to react with the Portland cement and SCMs. In general, lime is required to cause cementitious reactions to occur in cement compositions. Insufficient lime may cause the cement components to not completely react which may cause the set cement to not have the required engineering properties. Portland cements may release lime upon reaction with water. However, additional lime may be required to stoichiometrically balance the amount of lime provide by the Portland cement with lime provided by SCMs. Some SCMs may require additional lime to set as they may be devoid of free lime or lime that is released upon reaction with water. Oxide analysis or other analytical techniques performed on the SCM to determine the mineralogical makeup of the SCM or Portland cement which may then be utilized to determine additional lime required.

An additional consideration when selecting additional lime to include in the extended-life cement composition is that relatively more lime may limit the shelf life of the extended-life cement composition. Additional lime may cause cementitious hydration reactions to proceed in the extended life cement composition which may in turn cause gelation and setting of the extended-life cement composition. Conversely, limiting additional lime may prolong shelf life the extended-life cement composition.

After the supplementary cementitious materials and lime, if any, are selected in step 608, the selected materials may be passed to step 610 as indicated by arrow 609. In step 610, the selected Portland cement, SCM(s), lime, and water required to reach the density specified in step 402 may be combined to form a cement slurry. The cement slurry may be tested in a UCA, using as described above at the temperature and pressure defined in step 402. The UCA test may give information about the compressive strength and gelation of the cement slurry over a period of time. The results of the UCA test may then be compared against the engineering parameters defined in step 402, represented by arrow 611 and decision point 612. In decision point 612, the UCA tests may be compared against one or more engineering parameters such as compressive strength and gelation time to determine if the prepared cement composition needs to be adjusted. For example, if the prepared slurry is considered to have met the engineering parameters defined in step 402, the method may proceed to step 406, via arrow 614, as will be discussed below. Alternatively, if the compressive strength requirement is not met or gelation occurs with mixing, the prepared slurry may be considered to have not met the engineering parameters defined in step 402 and the method may proceed back to step 602 as indicated by arrow 613. Another Portland cement may then be selected that is not the same as the previously selected Portland cement and step 602, step 608, and step 610 may be repeated until a slurry that meets the engineering parameters defined in step 402 is found that meets compressive strength requirements and does not exhibit gelation beyond what is defined in step 402.

With further reference to FIG. 4, after the step of selecting Portland cement and SCMs in step 404, the method may proceed to step 406 whereby a retarder and concentration thereof may be selected. As discussed above, some engineering parameters set forth in step 402 may include the shelf life time or time required to remain in a pumpable fluid state and the rate of gelling. As one of ordinary skill in the art will appreciate, there may be a wide variety of retarders suitable for inclusion in an extended-life cement composition, only some of which may be enumerated herein. Matrix 2 is a listing of some retarders which may be included in the extended-life cement compositions.

| Matrix 2 | | |
|---|---|---|
| Type | Viscosity Effect | Relative Strength |
| Lignosulfonate | Dispersing | Medium |
| Synthetic | Neutral to Viscosifying | High |
| Inorganic | Neutral to Viscosifying | High |
| Sugars | Viscosifying | Medium |
| Organic Acids | Gel Control/Slight Dispersion | High |

Figure 7:
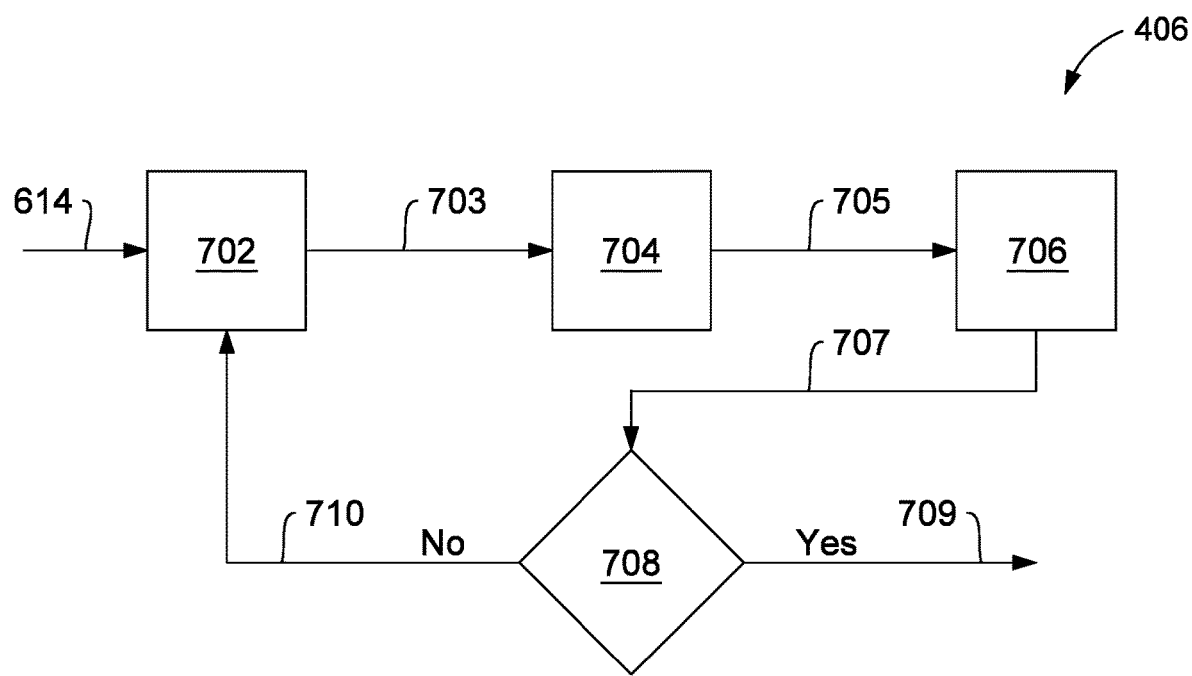
FIG. 7 is a flowchart illustrating an example method of selecting a retarder.

FIG. 7 is a flowchart illustrating a detailed procedure for step 406 for selecting a retarder and concentration thereof. Step 406 as illustrated in FIG. 7 may begin with selecting a retarder based on the shelf life and thickening time requirements from the engineering parameters defined in step 402. A retarder may be classified as a weak retarder if the effect on slowing the hydration reaction is not strong. Alternatively, a retarder may be classified as strong if the retarder slows the hydration reaction to a greater extent than the retarder classified as weak. As shown in Matrix 2, some retarders may also have secondary effects on viscosity which may affect the ability of an extended life cement composition to remain flowable. In step 702, a retarder may be selected based at least in part on the viscosifying effects of the retarder and relative strength of the retarder. Multiple concentrations of retarder may also be selected such that multiple quantification tests may be performed as will be described below. In some examples, a correlation may be utilized which correlates an input of engineering parameters and outputs a retarder based at least in part on the viscosifying effects of the retarder and relative strength of the retarder to meet the engineering parameters.

From step 702, the selected retarder and concentration thereof may be passed to step 704 as indicated by arrow 703. In step 704, the retarder's effect on setting may be quantified. The selected Portland cement and SCMs from step 404 may be combined with water and the retarder to form a cement slurry which may then be tested for multiple time periods. A plurality of cement slurries may be prepared with varying concentrations of the selected retarder to be tested. The prepared cement slurries may be monitored over multiple days to determine the effectiveness of the retarder on flowability of the cement slurries. For example, the flowability of each prepared cement slurry may be characterized as very flowable, flowable with slight resistance to mixing, flowable with high resistance to mixing, and not flowable. The flowability testing may be performed over a period of days to determine the longer term stability of the prepared cement slurries. Some tests may include monitoring flowability for 1 day, 2 days, 3 days, 7 days, 10 days, or longer. In some examples, a cement may have a flowability requirement. The results of the testing performed in step 704 may be compared against the engineering parameters set forth in step 402 to determine if the selected retarder and concentration thereof meets at least some of the engineering parameters. From step 704, the method may proceed to step 706 as indicated by arrow 705.

In step 706, the rate of gelling may be quantified. Cement slurries may be prepared including the selected Portland cement, SCMs, water, and retarder as in step 704. The rate of gelling may be quantified by any method. One method may include measuring gel strength in a viscometer at 3 RPM over a period of time. The results of the viscometer readings may be plotted and a best-fit slope of the data may be an indication of the rate of gelling.

From step 706, the method may proceed to decision point 708 whereby the prepared cement slurries from steps 704 and 706 may be compared to the engineering parameters set forth in step 402. If the prepared slurry is deemed to meet the engineering parameters, step 406 may be considered complete and the method may move to step 408 as indicated by arrow 709. If the slurries are deemed to not meet the engineering parameters, the method may proceed back to step 702 as indicate by arrow 710. Step 406 may then begin again with selection of another retarder with a different chemical identity than the first selected retarder.

Figure 8:
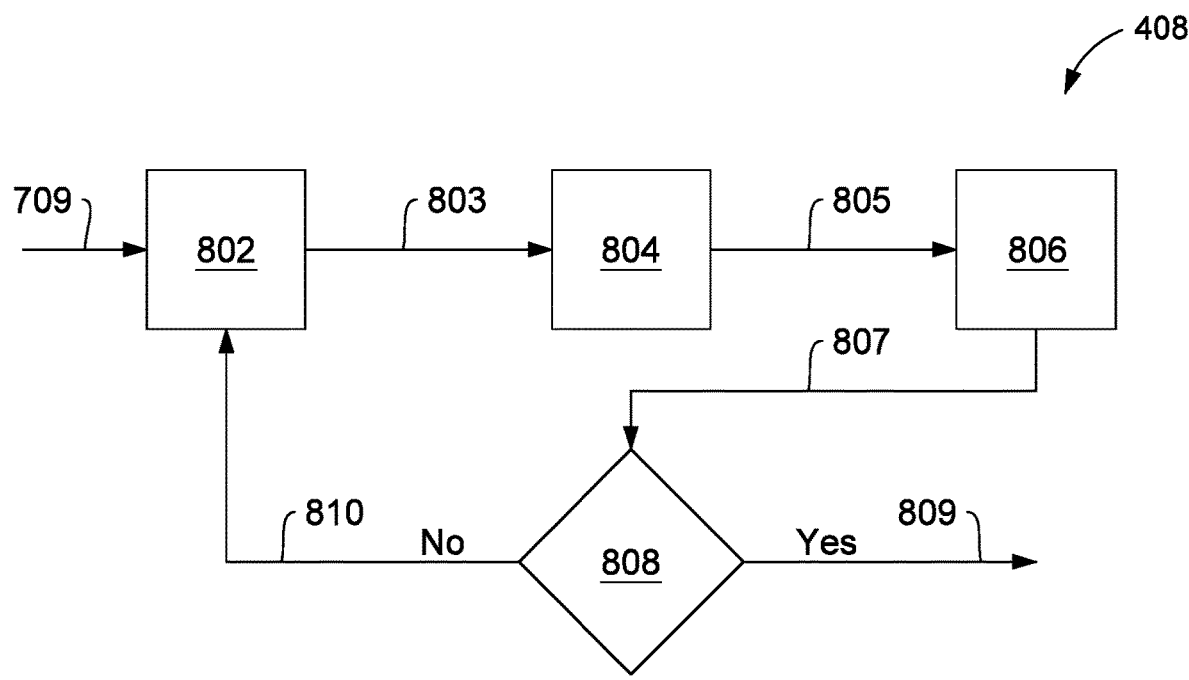
FIG. 8 is a flowchart illustrating an example method of designing an extended-life cement composition to have rheological stability.

With reference to FIG. 4, from step 406, the method may proceed to step 408 as indicated by arrow 709. In step 408, the rheological stability of the extended-life cement slurry may be adjusted. Some engineering parameters specified in step 402 may include the viscosity required to meet the rheological hierarchy at casing and annular shear rates as well as the rate of gelling that may occur from shearing the extended-life cement slurry. FIG. 8 is a flowchart illustrating a detailed procedure for step 408 to design the extended-life cement slurry to meet rheological stability requirements defined in step 402.

In FIG. 8, the method may begin with step 802 with the input from step 406 as indicated by arrow 709. In step 802 a viscosifier or dispersing agent and concentration thereof may be selected based on the results of the flowability results from step 704 and the gelling rate results from step 706 as shown in FIG. 7. Viscosifying agents and dispersing agents may be selected based at least in part on engineering parameters determined in step 402 such as wellbore temperature and from the water requirement of the Portland cement and SCMs selected in step 404. Any of the previously mentioned viscosifying agents and/or dispersing agents previously discussed may be included in examples of the extended-life cement composition. Matrix 3 is a selection matrix for selecting concentrations of viscosifying agents and dispersing agents based on the temperature provided in the engineering parameters of step 402 and the water requirement of the selected Portland cement and SCMs from step 404. The selection made in Matrix 3 may be a first guess for a starting concentration of viscosifying agents and/or dispersing agents. A final concentration of dispersant and viscosifier may be selected based on testing methods described below.

| Matrix 3 | | | | |
|---|---|---|---|---|
| Temperature | High | select 0.1%-0.2% BWOC dispersant/viscosifier | select 0.2%-0.3% BWOC dispersant/viscosifier | select 0.2%-0.5% BWOC dispersant/viscosifier |
| | Medium | select 0.1% BWOC dispersant/viscosifier | select 0.1%-0.2% BWOC dispersant/viscosifier | select 0.2 BWOC dispersant/viscosifier |
| | Low | select 0.05%-0.1% BWOC dispersant/viscosifier Low | select 0.1% BWOC dispersant/viscosifier Medium | select 0.1%-0.2% BWOC dispersant/viscosifier High |
| | | Water to Blend Ratio (blend = Portland plus SCM's) | | |

In step 802 a viscosifier or dispersing agent and concentration thereof may be selected based on the results of the flowability results from step 704 and the gelling rate results from step 706 in view of the engineering parameters from step 402 and calculated water requirement determined in step 404. From step 802, the method may proceed to step 804 as indicated by arrow 803. In step 804, a plurality of cement slurries may be prepared that include the Portland cement, SCMs, retarder, water, and viscosifying and/or dispersing agent. The plurality of cement slurries may be prepared that includes varying concentrations of viscosifying and/or dispersing agents to determine the effects of concentration thereof on rheology. The prepared cement slurries may be tested in a consistometer at casing and/or annular shear rates to measure the apparent viscosity. From step 804, the method may proceed to step 806 where the gel strength for shelf life may be measured. A consistometer may be utilized at a specified RPM, such as 3 RPM, and the gel strength may be recorded over a period of time. For example, the test may include monitoring gel strength for 1 day, 2 days, 3 days, 7 days, 10 days, or longer. The results of gel strength testing pay be plotted and the slope of the best-fit line may be the rate of gelling. Although only one method of measuring apparent viscosity and rate of gelling are enumerated herein, there may be other tests for apparent viscosity and gel strength that may provide equivalent or similar information about gel strength and apparent viscosity.

From step 806, the method may proceed to step 808 as indicated by arrow 807. In decision point 808. In decision point 808, the results of step 804 and 806 may be compared against the engineering parameters defined in step 402. If one of the tested slurries is deemed to meet the engineering parameters, step 408 may be considered complete and the method may move to step 410 as indicated by arrow 809. If the slurries are deemed to not meet the engineering parameters, the method may proceed back to step 802 as indicate by arrow 810. Step 408 may then begin again with selection of another viscosifying and/or dispersing agent with a different chemical identity and steps 804 and 806 may be repeated to test the newly selected viscosifying and/or dispersing agent.

With further reference to FIG. 4, after the step of designing for rheological stability in step 408, the method may proceed to step 410 whereby an activator and concentration thereof may be selected. As discussed above, some engineering parameters set forth in step 402 may include the 24-hour compressive strength requirement or other strength requirements, which may be defined by regulation or best practices. As one of ordinary skill in the art will appreciate, there may be a wide variety of activators suitable for inclusion in an extended-life cement composition, only some of which may be enumerated herein. Any of the previously mentioned activators may be suitable for inclusion in an extended-life cement composition. As discussed above, some engineering parameters set forth in step 402 may include wellbore temperature, thickening time, and compressive strength at various times such as 24 hours, for example.

Figure 9:
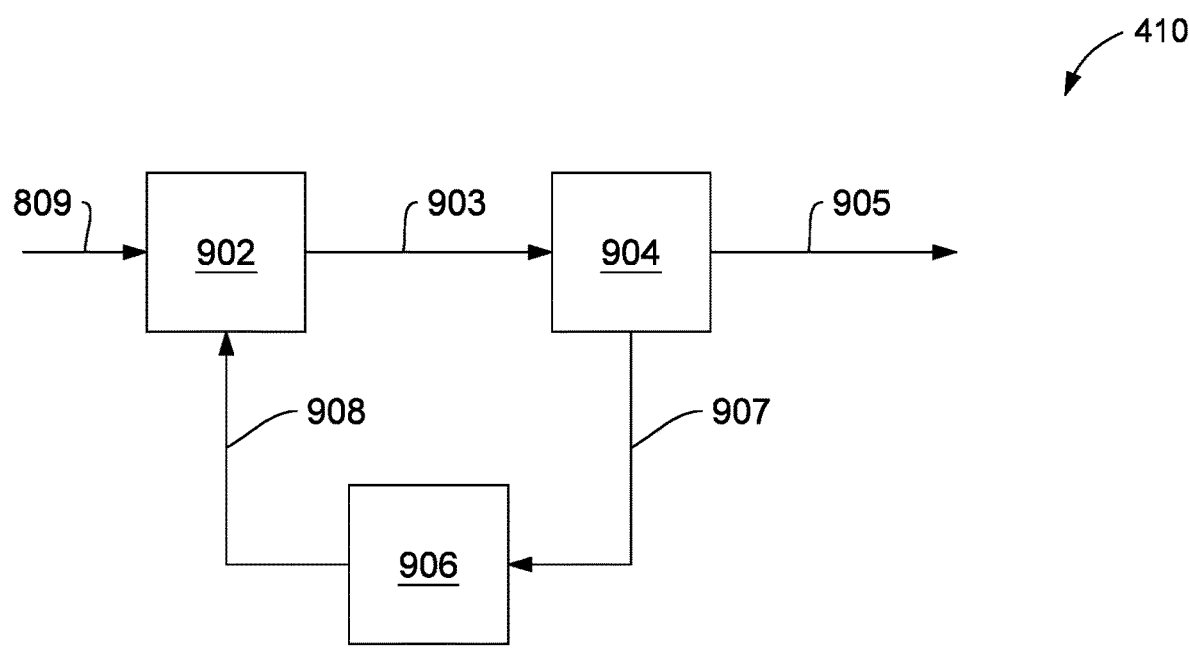
FIG. 9 is a flowchart illustrating an example method of selecting an activator.

FIG. 9 is a flowchart illustrating a detailed procedure for step 410 to select an activator and concentration thereof to meet the engineering parameter defined in step 402. As shown in FIG. 9, step 410 may begin with the input from arrow 809 from step 408. Arrow 809 may represent the extended-life cement composition developed from steps 404, 406, and 408 and may include Portland cement, SCMs, retarders, and viscosifiers and/or dispersants, for example. In step 902, the extended-life cement composition may be prepared at the density specified by the engineering parameters from step 402 and the resultant slurry may be introduced into an ultrasonic cement analyzer or other apparatus capable of measuring thickening time and compressive strength at the temperature and pressure specified in the engineering parameters from step 402. The prepared cement slurry may be monitored for thickening time and compressive strength at the conditions specified by the engineering parameters from step 402. In step 904, the results of the UCA test or equivalent test may be compared to the engineering parameters from step 402. If the thickening time and compressive strength requirements are met, no activator may be required as the prepared slurry can set with temperature alone and the method may proceed to step 412 as indicated by arrow 905. Alternatively, if the test in step 904 indicates the thickening time is too short, a retarder may be required to be added and the method may be returned to step 406 to select the retarder. Further, if the thickening time is too long, an activator may be required to be added to the extended-life cement composition. The method may progress to step 906 as indicated by arrow 907. In step 906, an activator and concentration thereof may be selected and the method may return to step 902 as shown by arrow 908. The selection of activator may be based at least in part on temperature and reactivity of the activator. A cement slurry may be prepared and tested according to the method above until a thickening time is achieved that is within the specification of step 402.

With further reference to FIG. 4, after the step of selecting an activator and concentration thereof in step 410, the method may proceed to step 412 whereby the compressive strength of the cement composition may be verified by destructive or non-destructive means. An extended life cement composition may be prepared based on the results of steps 404, 406, 408, and 410 and may include Portland cement, SCMs, retarders, viscosifiers and/or dispersants, and a retarder for example. The extended-life cement composition may be prepared with sufficient water to reach the density defined in step 402. The cement composition may be cured at the temperature and pressure specified by step 402 and thereafter be subjected to compressive strength testing such as unconfined compressive strength testing. If a result of the compressive strength test indicates that the compressive strength is lower than required as set out in step 402, the method may return to step 406 to select another retarder or a concentration of retarder or the method may return to step 410 to select and/or increase a concentration of accelerator. Alternatively, the method may return to step 402 to select a higher concentration of Portland cement or to select a more reactive Portland cement.

As will be appreciated by those of ordinary skill in the art, examples of the extended-life cement compositions may be used in a variety of subterranean operations, including primary and remedial cementing. In some embodiments, an extended-life cement composition may be provided that includes hydraulic cement, a supplementary cementitious material, a retarder, and water. The extended-life cement composition may be prepared according to any method disclosed herein such that the extended-life cement composition has the property of being able to remain in a pumpable fluid state for an extended period of time. An activator may be included in the extended-life cement composition such that the extended-life cement composition may set. In examples, the extended-life cement composition may be introduced into a subterranean formation and allowed to set therein. As used herein, introducing the extended-life cement composition into a subterranean formation includes introduction into any portion of the subterranean formation, including, without limitation, into a wellbore drilled into the subterranean formation, into a near wellbore region surrounding the wellbore, or into both. Embodiments may further include activation of the extended-life cement composition. The activation of the extended-life cement composition may include, for example, the addition of a cement set activator to the extended-life cement composition.

In some examples, an extended-life cement composition may be provided that includes hydraulic cement, a supplementary cementitious material, a retarder, and water. The extended-life cement composition may be prepared according to any method disclosed herein such that the extended-life cement composition has the property of being able to remain in a pumpable fluid state for an extended period of time. The extended-life cement composition may be stored, for example, in a vessel or other suitable container. The extended-life cement composition may be permitted to remain in storage for a desired time period. For example, the extended-life cement composition may remain in storage for a time period of about 1 day or longer. For example, the extended-life cement composition may remain in storage for a time period of about 1 day, about 2 days, about 5 days, about 7 days, about 10 days, about 20 days, about 30 days, about 40 days, about 50 days, about 60 days, or longer. In some embodiments, the extended-life cement composition may remain in storage for a time period in a range of from about 1 day to about 7 days or longer. Thereafter, the extended-life cement composition may be activated, for example, by addition of a cement set activator and subsequently introduced into a subterranean formation, and allowed to set therein.

In primary cementing embodiments, for example, the extended-life cement composition may be introduced into an annular space between a conduit located in a wellbore and the walls of a wellbore (and/or a larger conduit in the wellbore), wherein the wellbore penetrates the subterranean formation. The extended-life cement composition may be allowed to set in the annular space to form an annular sheath of hardened cement. The extended-life cement composition may form a barrier that prevents the migration of fluids in the wellbore. The extended-life cement composition may also, for example, support the conduit in the wellbore.

In remedial cementing embodiments, an extended-life cement composition may be used, for example, in squeeze-cementing operations or in the placement of cement plugs. By way of example, the extended-life composition may be placed in a wellbore to plug an opening (e.g., a void or crack) in the formation, in a gravel pack, in the conduit, in the cement sheath, and/or between the cement sheath and the conduit (e.g., a micro annulus).

An embodiment includes a method of cementing in a subterranean formation comprising: providing a cement composition including hydraulic cement, a supplementary cementitious material, a retarder, and water. The extended-life cement composition may be prepared according to any method disclosed herein such that the extended-life cement composition has the property of being able to remain in a pumpable fluid state for an extended period of time. The extended-life cement composition may then be introduced into the subterranean formation; and allowed set in the subterranean formation. The components of the cement composition including the selection of components are described in more detail in connection with the embodiments discussed above. The cement composition may be extended-life as described in the embodiments discussed above. Cement set activators such as those described previously may be used for activation of the cement composition.

The exemplary extended-life cement compositions disclosed herein may directly or indirectly affect one or more components or pieces of equipment associated with the preparation, delivery, recapture, recycling, reuse, and/or disposal of the disclosed extended-life cement compositions. For example, the disclosed extended-life cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary extended-life cement compositions. The disclosed extended-life cement compositions may also directly or indirectly affect any transport or delivery equipment used to convey the extended-life cement compositions to a well site or downhole such as, for example, any transport vessels, conduits, pipelines, trucks, tubulars, and/or pipes used to compositionally move the extended-life cement compositions from one location to another, any pumps, compressors, or motors (e.g., topside or downhole) used to drive the extended-life cement compositions into motion, any valves or related joints used to regulate the pressure or flow rate of the extended-life cement compositions, and any sensors (i.e., pressure and temperature), gauges, and/or combinations thereof, and the like. The disclosed extended-life cement compositions may also directly or indirectly affect the various downhole equipment and tools that may come into contact with the extended-life cement compositions such as, but not limited to, wellbore casing, wellbore liner, completion string, insert strings, drill string, coiled tubing, slick line, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydro mechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, the present disclosure may provide methods, systems, and apparatus that may relate to methods of designing extended life cement compositions. The methods, systems. and apparatus may include any of the various features disclosed herein, including one or more of the following statements.

Statement 1. A method of preparing a cement comprising: defining one or more engineering parameters of a proposed cement slurry; selecting at least: a cement and mass fraction thereof and at least one supplementary cementitious material and mass fraction thereof; a retarder and mass fraction thereof; and a water and mass fraction thereof, such that a slurry formed from the cement, the at least one supplementary cementitious material, the retarder, and the water meets at least one of the one or more engineering parameters and has a property of being capable of remaining in a pumpable fluid state for a period of about 1 day or greater at a temperature of about 80° F. in quiescent storage; and preparing the slurry.

Statement 2. The method of statement 1 wherein the cement is selected from the group consisting of Portland cements, pozzolana cements, gypsum cements, high alumina content cements, silica cements, and combinations thereof.

Statement 3. The method of any of statements 1-2 wherein the at least one supplementary cementitious material is selected from the group consisting of fly ash, blast furnace slag, silica fume, pozzolans, kiln dust, clays, and combinations thereof.

Statement 4. The method of any of statements 1-3 wherein the one or more engineering parameters comprise wellbore temperature, required compressive strength, and a gelling requirement, and wherein the step of selecting a cement and mass fraction thereof and at least one supplementary cementitious material and mass fraction thereof comprises: (a) selecting a first cement based at least in part on the wellbore temperature and a cement reactivity trend, wherein the cement reactivity trend comprises a correlation of cement reactivity with temperature;

(b) selecting at least a first supplementary cementitious material based at least in part on wellbore temperature, supplementary cementitious material reactivity, temperature sensitivity of reactivity, and water requirement of supplementary cementitious material; (c) calculating a silica content and a lime content for each of the first cement and the at least the first supplementary cementitious material and determining an additional amount of lime required based at least in part on a shelf life requirement; (d) preparing a first test slurry comprising the first cement and the at least the first supplementary cementitious material; (e) testing the prepared first test slurry to determine a first compressive strength and a first gelling rate; (f) comparing the first compressive strength to the required compressive strength and the first gelling rate to the gelling requirement and determining if the first compressive strength and the first gelling rate meet the required compressive strength and the gelling requirement; and (g) performing steps (a)-(f) with a second cement if the first compressive strength and the first gelling rate do not meet the required compressive strength and the gelling requirement, where the second cement has a different chemical identity than the first cement, or selecting the first cement if the first compressive strength and the first gelling rate meet the required compressive strength and the gelling requirement.

Statement 5. The method of any of statements 1-4 wherein the one or more engineering parameters comprise shelf-life time requirement and rate of gelling requirement and wherein the step of selecting a retarder and mass fraction thereof comprises: (a) selecting a first retarder based at least in part on the shelf-life time requirement and rate of gelling requirement; (b) preparing a plurality of cement slurries comprising the cement, the at least one supplementary cementitious material, and the first retarder, wherein the plurality of cement slurries each comprise the first retarder in disparate quantities; (c) monitoring the plurality of cement slurries for flowability and rate of gelling; (d) comparing the flowability and rate of gelling of the plurality of cement slurries to the shelf-life time requirement and the rate of gelling requirement and determining if the flowability and rate of gelling meet the shelf-life time requirement and the rate of gelling requirement; and e) performing steps (a)-(d) with a second retarder if the flowability and rate of gelling do not meet the shelf-life time requirement and the rate of gelling requirement, wherein the second retarder has a different chemical identity than the first retarder, or selecting the first retarder and a quantity of the first retarder if the flowability and rate of gelling meet the shelf-life time requirement and the rate of gelling requirement.

Statement 6. The method of statement 5 wherein the one or more engineering parameters further comprise wellbore temperature and wherein the method further comprises adjusting rheological stability, wherein adjusting rheological stability comprises: (f) selecting a first viscosifier, a first dispersant, or a combination thereof based at least in part on the flowability and rate of gelling from step (c), wellbore temperature, and water requirement of the cement and the at least one supplementary cementitious material; (g) preparing a second plurality of cement slurries comprising the cement, the at least one supplementary cementitious material, the selected retarder from step (e), and the selected first viscosifier, the first dispersant, or a combination thereof wherein the plurality of cement slurries each comprise the first viscosifier, the first dispersant, or a combination thereof in disparate quantities; (h) monitoring the second plurality of cement slurries rate of gelling; (i) comparing the rate of gelling of the second plurality of cement slurries to the rate of gelling requirement and determining if the rate of gelling meet the rate of gelling requirement; and (j) performing steps (f)-(k) with a second viscosifier, a second dispersant, or a combination thereof if the rate of gelling do not meet the rate of gelling requirement, wherein the second viscosifier, second dispersant, or both the second viscosifier and the second dispersant have a different chemical identity than the first viscosifier and first dispersant, or selecting the first viscosifier, the first dispersant, or both the first viscosifier and the first dispersant and a quantity of the first viscosifier and the first dispersant if the rate of gelling meet the rate of gelling requirement.

Statement 7. The method of statement 6 wherein the one or more engineering parameters further comprise a thickening time requirement, a compressive strength requirement, a required density, and a wellbore pressure and wherein the method further comprises: (k) preparing a third cement slurry comprising the cement, the at least one supplementary cementitious material, the selected retarder from step (e), and the selected first viscosifier, the first dispersant, or a combination thereof from step (j) and water in a sufficient amount such that the slurry has a density of approximately the required density; (l) curing the third cement slurry at or above the wellbore pressure and temperature and monitoring thickening time and compressive strength of the third cement slurry; (m) comparing the thickening time and compressive strength of the third cement slurry to the compressive strength requirement and thickening time requirement; and (n) determining if an activator or additional retarder is required based at least in part on step (m) and selecting an activator if an activator is required.

Statement 8. The method of statement 7 wherein the step of determining if an activator is required comprises: (o) comparing the thickening time and compressive strength of the third cement slurry to the compressive strength requirement and thickening time requirement; and (p) selecting a first activator based at least in part on temperature and reactivity of the activator; (q) preparing a fourth cement slurry comprising the cement, the at least one supplementary cementitious material, the selected retarder from step (e), and the selected first viscosifier, the first dispersant, or a combination thereof from step (j), water in a sufficient amount such that the slurry has a density of approximately the required density, and the first activator; (r) curing the fourth cement slurry at or above the wellbore pressure and temperature and monitoring thickening time and compressive strength of the fourth cement slurry; (s) comparing the thickening time and compressive strength of the fourth cement slurry to the compressive strength requirement and thickening time requirement; and (t) performing steps (o)-(s) with a second activator if the thickening time and compressive strength of the fourth slurry do not meet the compressive strength requirement and thickening time requirement, wherein the second activator has a different chemical identity than the first activator.

Statement 9. The method of statement 7 wherein the step of determining if additional retarder is required comprises: (o) comparing the thickening time and compressive strength of the third cement slurry to the compressive strength requirement and thickening time requirement; and (p) selecting a first additional retarder based at least in part on temperature and reactivity of the retarder; (q) preparing a fifth cement slurry comprising the cement, the at least one supplementary cementitious material, the selected retarder from step (e), and the selected first viscosifier, the first dispersant, or a combination thereof from step (j), water in a sufficient amount such that the slurry has a density of approximately the required density, and the first additional retarder; (r) curing the fifth slurry at or above the wellbore pressure and temperature and monitoring thickening time and compressive strength of the fifth cement slurry; (s) comparing the thickening time and compressive strength of the fifth cement slurry to the compressive strength requirement and thickening time requirement; and (t) performing steps (o)-(s) with a second additional retarder if the thickening time and compressive strength of the fifth slurry do not meet the compressive strength requirement and thickening time requirement, wherein the second additional retarder has a different chemical identity than the first additional retarder.

Statement 10. A method comprising: defining at least one engineering parameter of a proposed cement slurry; selecting a cement that meets the at least one engineering parameter; selecting a supplementary cementitious material that meets the at least one engineering parameter; selecting a retarder that meets the at least one engineering parameter; and preparing a slurry comprising the cement, the supplementary cementitious material, and the retarder, wherein the slurry comprises the cement in an amount of 50% or less, wherein the slurry meets at least one of the at least one engineering parameter, and wherein the slurry has a property of being capable of remaining in a pumpable fluid state for a period of about 1 day or greater at a temperature of about 80° F. in quiescent storage.

Statement 11. The method of statement 10 wherein the cement is selected from the group consisting of Portland cements, pozzolana cements, gypsum cements, high alumina content cements, silica cements, and combinations thereof.

Statement 12. The method of any of statements 10-11 wherein the cement is selected from the group consisting of fly ash, blast furnace slag, silica fume, pozzolans, kiln dust, clays, and combinations thereof.

Statement 13. The method of any of statements 10-12 wherein the at least one engineering parameter comprises a wellbore temperature, a compressive strength requirement, and a gelling requirement and wherein the step of selecting the cement comprises selecting a cement such that the prepared slurry comprising the cement that meets the compressive strength requirement and a gelling requirement.

Statement 14. The method of any of statements 10-13 wherein the at least one engineering parameter comprises a wellbore temperature, a compressive strength requirement, and a gelling requirement and wherein the step of selecting the supplementary cementitious material comprises selecting a supplementary cementitious material such that the prepared slurry comprising the supplementary cementitious material meets the compressive strength requirement and a gelling requirement.

Statement 15. The method of any of statements 10-14 wherein the at least one engineering parameter comprises shelf-life time requirement and rate of gelling requirement and wherein the step of selecting the retarder comprises selecting a retarder such that the prepared slurry comprising the retarder meets the compressive strength requirement and a gelling requirement.

Statement 16. The method of any of statements 10-15 wherein the at least one engineering parameter comprises a flowability requirement and rate of gelling requirement, wherein the method further comprises selecting a viscosifier, wherein the viscosifier is included in the prepared slurry, and wherein the step of selecting the viscosifier comprises selecting a viscosifier such that the prepared slurry comprising the viscosifier meets the flowability requirement and rate of gelling requirement.

Statement 17. The method of any of statements 10-16 wherein the at least one engineering parameter comprises a flowability requirement and rate of gelling requirement, wherein the method further comprises selecting a dispersant, wherein the dispersant is included in the prepared slurry, and wherein the step of selecting the dispersant comprises selecting a dispersant such that the prepared slurry comprising the dispersant meets the flowability requirement and rate of gelling requirement.

Statement 18. The method of any of statements 10-16 wherein the at least one engineering parameter comprises a thickening time requirement and a compressive strength requirement, wherein the method further comprises selecting an activator, wherein the activator is included in the prepared slurry, and wherein the step of selecting the activator comprises selecting an activator such that the prepared slurry comprising the activator meets the thickening time requirement and a compressive strength requirement.

Statement 19. The method of statement 18 wherein the cement slurry is prepared by: combining the cement, the supplementary cementitious material, the retarder, and water to form the cement slurry; storing the cement slurry for a period of about 1 day or greater; and combining the activator with the cement slurry to form an activated cement slurry.

Statement 20. The method of statement 19 further comprising placing the cement slurry in a subterranean formation.

To facilitate a better understanding of the present embodiments, the following examples of certain aspects of some embodiments are given. In no way should the following examples be read to limit, or define, the entire scope of the embodiments.

EXAMPLES

Example 1

A test was performed to determine differences between cement types for use in extended-life cement slurries. Two identical low-Portland cement compositions were prepared according to Table 1 utilizing class H Portland cement and class G Portland cement. Each component was measured relative to cement, either class H or class G, and is presented in the table as by weight of cement (BWOC).

TABLE 1

| Material | Sample 1 (% BWOC) | Sample 2 (% BWOC) |
|---|---|---|
| Class H | 100 | — |
| Class G | — | 100 |
| Class F Fly Ash | 250 | 250 |
| Natural Glass | 150 | 150 |
| Defoamer | 1.4 | 1.4 |
| Water | 225 | 225 |

The slurries in Table 1 were prepared as follows. First, all dry components were weighed into a glass container having a clean lid and agitated by hand until blended. Tap water was then weighed into a blender jar and the defoamer was added. The dry components were then mixed into the water with 4,000 rpm stirring. The blender speed was then increased to 12,000 rpm for about 35 seconds. Following mixing, the slurries were immediately poured into an ultrasonic cement analyzer (UCA). The ultrasonic cement analyzer tests were performed at 180° F. (82° C.) at 3,000 psi (20,684 kPa) for 72 hours, on each sample, for a total of two UCA tests. After the tests completed, the cured samples were removed from the UCA, and then crushed in an unconfined crush test and the crush value obtained was used to correct the UCA plots. The results of the test are shown in Table 2.

TABLE 2

| Sample | Temp (° F.) (° C.) | 50 psi crush corrected (hh:mm) | 24 hr crush corrected UCA (psi) (kPa) | 72 hr crush corrected UCA (psi) | 72 hour crush |
|---|---|---|---|---|---|
| Sample 1 | 180 (82) | 4:07 | 1569 (8060) | 2084 (14368) | 2019 (13920) |
| Sample 2 | 180 (82) | 4:06 | 1136 (7832) | 1741 (12003) | 1730 (11928) |

Additionally, after pouring the UCA test of Sample 1 and Sample 2, the excess slurry was transferred to a beaker and left on a benchtop. Over a 4-hour period, the benchtop slurries were stirred by hand to qualitatively determine which slurry exhibited fast and more gelation. After 4 hours, it was observed that sample 1 including class H Portland cement was much less gelled than sample 2 including class G Portland cement.

Example 2

Based on the results of Example 1, class H cement was chosen to continue testing. A sample of cement slurry was prepared as according to sample 1 from Table 1. The samples were poured into 12 individual containers where each container had 175 grams of slurry. The slurries were dosed with varying amounts of retarder 1 or retarder 2, indicated in Table 4 as by weight of blend (BWOB). Retarder 1 is a lignosulfonate retarder and retarder 2 is a mixture of acrylic copolymers. The samples were placed on a benchtop and tracked for 7 days. Each day the slurries were stirred and measured based on a relative observational scale to qualitatively determine the effectiveness of each retarder concentration. Table 3 shows the observational scale used to determine retarder effectiveness and Table 4 shows the results of each sample at each observed day.

TABLE 3

| Scale | |
|---|---|
| 1 | Very Flowable |
| 2 | Flowable w/ slight resistance |
| 3 | Flowable w/ a lot of resistance |
| 4 | Not fluid |

TABLE 4

| Retarder | BWOB | Day 1 | Day 2 | Day 3 | Day 4 | Day 5 | Day 6 | Day 7 |
|---|---|---|---|---|---|---|---|---|
| Retarder 1 | 0.5 | 1 | — | — | 1 | 1 | 1 | 1 |
| Retarder 1 | 1 | 1 | — | — | 1 | 3 | 2 | 3 |
| Retarder 1 | 2 | 1 | — | — | 2 | 2 | 3 | 3 |
| Retarder 1 | 3 | 1 | — | — | 2 | 3 | 3 | 3 |
| Retarder 1 | 4 | 1 | — | — | 2 | 3 | 3 | 3 |
| Retarder 1 | 5 | 1 | — | — | 3 | 3 | 3 | 4 |
| Retarder 2 | 0.5 | 1 | — | — | 2 | 2 | 4 | 4 |
| Retarder 2 | 1 | 1 | — | — | 3 | 4 | 3 | 4 |
| Retarder 2 | 2 | 1 | — | — | 2 | 2 | 3 | 3 |
| Retarder 2 | 3 | 1 | — | — | 2 | 2 | 3 | 3 |
| Retarder 2 | 4 | 1 | — | — | 3 | 3 | 3 | 4 |
| Retarder 2 | 5 | 1 | — | — | 2 | 3 | 3 | 3 |

After comparing all experimental results shown in Table 4, lignosulfonate (retarder 1) at 0.5 by weight of blend was selected for further testing. Lignosulfonate was selected as the retarder due to its ability to retain good slurry rheology over an extended period while preventing setting of the cement.

Example 3

A laboratory scale batch of extended-life cement was prepared based on the results from Example 1 and Example 2. A 14 pound per gallon (ppg) (1677.6 kg/m^3) slurry was prepared according to Table 5, sometimes referred to below as extended life slurry (ELS) ELS-1. Each component was measured by weight of cementitious materials (BWOC) which includes class H cement, class F fly ash, and natural glass.

TABLE 5

| Material | % BWOC |
|---|---|
| Class H cement | 20 |
| Class F Fly Ash | 50 |
| Natural Glass | 30 |
| Defoamer | 0.20 |
| Water | 45 |
| Lignosulfonate Retarder | 0.5 |
| Suspending Agent | 0.01 |

A blender was used to prepare the extended-lite slurry. First, all the dry components class H cement, class F fly ash, natural glass, and lignosulfonate retarder were weighed into a container and dry blended together. The mix water was added to the blender along with the defoamer with the blender running at 4000 rpm for stirring. After all the powder was incorporated, the slurry was blended at 12000 rpm for 35 seconds until homogeneous. After the homogenization period the blender speed was reduced to 8000 rpm and the suspending aid was dosed in as needed to obtain a stable slurry. The slurry was then poured into a bucket and covered with a lid for storage.

The slurry was monitored daily and it was observed that the slurry remained in a fluid state for a period of 12 days. Observationally, the fluid had a very low apparent viscosity and overnight would settle and develop around 0.25 inches (0.635 cm) layer of free water. Rheological values were determined using a Fann Model 35 viscometer. Prior to testing rheology, the slurry was thoroughly blended. Dial readings were recorded at speeds of 3, 6, 100, 200, and 300 with a B1 bob, an R1 rotor, and a 1.0 spring. The dial readings vs RPM data for the slurries were measured in accordance with API Recommended Practices 10B, $2^{nd}$ Edition April 2013, and the apparent viscosity at shear rate of 170 1/sec was computed. The results of the viscosity testing are shown in Table 6.

TABLE 6

| | Viscometer RPM | | | | | | | Apparent Viscosity at |
|---|---|---|---|---|---|---|---|---|
| Age | 3 | 6 | 30 | 60 | 100 | 200 | 300 | 170 1/sec (cP) |
| 0 | 6 | 9 | 25 | 42 | 60 | 106 | 153 | 180 |
| 1 | 5 | 8 | 23 | 38 | 57 | 107 | 162 | 171 |
| 4 | 4 | 6 | 17 | 30 | 48 | 106 | 165 | 144 |
| 5 | 5 | 7 | 18 | 30 | 43 | 75 | 106 | 129 |
| 6 | 6 | 8 | 21 | 35 | 50 | 86 | 120 | 150 |

A second laboratory scale batch of extended-life cement was prepared based on the results from Example 1 and 2 and the results from the first test of Example 3. A 14 pound per gallon (ppg) (1677.6 kg/m^3) slurry was prepared according to Table 7, sometimes referred to below as ELS-2. 1.10 grams of suspending agent was used to reduce settling. Each component was measured by weight of cementitious materials (BWOC) which includes class H cement, class F fly ash, and natural glass.

TABLE 7

| Material | % BWOC |
|---|---|
| Class H cement | 20 |
| Class F Fly Ash | 50 |
| Natural Glass | 30 |
| Defoamer | 0.20 |
| Water | 45 |
| Lignosulfonate Retarder | 0.5 |
| Suspending Agent | 0.04 |

Rheological values were determined using a Fann Model 35 viscometer. Prior to testing rheology, the slurry was thoroughly blended. Dial readings were recorded at speeds of 3, 6, 100, 200, and 300 with a B1 bob, an R1 rotor, and a 1.0 spring. The dial readings vs RPM data for the slurries were measured in accordance with API Recommended Practices 10B, $2^{nd}$ Edition April 2013, and the apparent viscosity at shear rate of 170 1/sec was computed. The results of the viscosity testing are shown in Table 8.

TABLE 8

| | Viscometer RPM | | | | | | | Apparent Viscosity at |
|---|---|---|---|---|---|---|---|---|
| Age | 3 | 6 | 30 | 60 | 100 | 200 | 300 | 170 1/sec (cP) |
| 0 | 15 | 19 | 38 | 59 | 82 | 134 | 182 | 246 |
| 1 | 18 | 24 | 49 | 74 | 103 | 164 | 222 | 309 |
| 4 | 21 | 29 | 60 | 93 | 126 | 196 | 258 | 378 |

TABLE 8-continued

| | Viscometer RPM | | | | | | | Apparent Viscosity at |
|---|---|---|---|---|---|---|---|---|
| Age | 3 | 6 | 30 | 60 | 100 | 200 | 300 | 170 1/sec (cP) |
| 5 | 24 | 31 | 64 | 95 | 129 | 205 | 271 | 387 |
| 6 | 18 | 26 | 62 | 95 | 132 | 208 | 266 | 396 |
| 7 | 22 | 29 | 61 | 94 | 130 | 213 | 287 | 390 |

After 7 days, compressive strength development was investigated using Ultrasonic Cement Analyzers. A low temperature test was performed where the slurry was mixed with a calcium chloride activator ($CaCl_2$) and a high temperature test was performed where no activator was used. The $CaCl_2$ activator had the following formulation:

TABLE 9

| Component | Mass |
|---|---|
| $CaCl_2$ Powder | 380. grams |
| Water | 620.0 grams |

The slurries were activated by adding an amount of liquid calcium chloride such that the equivalent amount of dry calcium chloride at 10% by weight of dry blend of either ELS 1 formulated according to Table 5 or ELS 2 formulated according to Table 7. For example, 122.3 grams of the liquid activator solution was added to 675.0 grams of ELS 2 liquid slurry and combined with stirring. Rheological values were measured after the addition of the liquid activator solution, the results thereof which are shown in Table 10.

TABLE 10

| | Viscometer RPM | | | | | | |
|---|---|---|---|---|---|---|---|
| | 3 | 6 | 30 | 60 | 100 | 200 | 300 |
| Activated ELS-2 | 5.1 | 7 | 14.7 | 23.5 | 32.2 | 52.6 | 71 |

After rheological testing was performed, the slurries were placed in an ultrasonic cement analyzer at 3000 psi (20684 kPa) and respective temperatures noted in Table 11.

TABLE 11

| Material | Temp °F. (° C.) | 50 psi crush strength corrected (hh:mm) | 24 hour crush strength corrected UCA (psi) (kPa) | 72 hour crush strength corrected UCA (psi) (kPa) |
|---|---|---|---|---|
| ELS-2 14.0 ppg + 10% CaCl2 | 70 (21) | 31:28 | 0 (0) | 250 (1724) |
| ELS-2 14.0 ppg + 10% CaCl2 | 100 (37.8) | 25:04 | 34 (234) | 260 (1792) |
| ELS-2 14.0 ppg + 10% CaCl2 | 140 (60) | 22:09 | 246 (1696) | 777 (5357) |
| ELS-1 14.0 ppg | 180 (82.2) | 16:02 | 1401 (9659) | 3294 (22711) |
| ELS-1 14.0 ppg | 250 (121) | 4:13 | 2537 (17492) | 4110 (28377) |

It is observed from the results of Table 11 that the extended life slurry is activatable and develops compressive strengths at 70° C.

Example 4

An extended life slurry with the same base blend as Example 3 but with higher solids content was formulated to reach a 14.5 ppg (1737 kg/m^3) base slurry. The 14.5 ppg slurry, referred to as ELS 3 below, was formulated according to Table 12. The solids content was increased while the other components such as retarder and water were held static. The suspending aid amount was adjusted to account for higher viscosity of the slurry. The slurry was prepared following the same procedure described in Example 3. Rheologies of the 14.5 ppg slurry were taken on the Fann 35 with the same conditions as before the results thereof displayed in Table 13. Each component was measured by weight of cementitious materials (BWOC) which includes class H cement, class F fly ash, and natural glass.

TABLE 12

| Material | % BWOC |
|---|---|
| Class H cement | 20 |
| Class F Fly Ash | 50 |
| Natural Glass | 30 |
| Defoamer | 0.17 |
| Water | 37.8 |
| Lignosulfonate Retarder | 0.42 |
| Suspending Agent | 0.02 |

TABLE 13

| | Viscometer RPM | | | | | | | Apparent Viscosity at |
|---|---|---|---|---|---|---|---|---|
| Age | 3 | 6 | 30 | 60 | 100 | 200 | 300 | 170 1/sec (cP) |
| 0 | 7 | 10 | 53 | 53 | 86 | 152 | 225 | 249 |
| 1 | 7 | 10 | 61 | 61 | 96 | 182 | 272 | 288 |
| 4 | 20 | 27 | 104 | 104 | 150 | 262 | — | 450 |
| 7 | 26 | 36 | 118 | 118 | 165 | 268 | — | 495 |

After 7 days, compressive strength development was investigated using Ultrasonic Cement Analyzers. Table 14 shows the results of the UCA testing.

TABLE 14

| Material | Temp °F. (° C.) | 50 psi crush strength corrected (hh:mm) | 24 hour crush strength corrected UCA (psi) (kPa) | 72 hour crush strength corrected UCA (psi) (kPa) |
|---|---|---|---|---|
| ELS-3 14.5 ppg + 10% CaCl2 | 70 (21) | 05:55 | 105 (724) | 202 (1393) |
| ELS-3 14.5 ppg + 10% CaCl2 | 100 (37.8) | 03:53 | 236 (1627) | 604 (4164) |
| ELS-3 14.5 ppg + 10% CaCl2 | 140 (60) | 3:00 | 530 (3654) | 662 (4564) |

Figure 10:
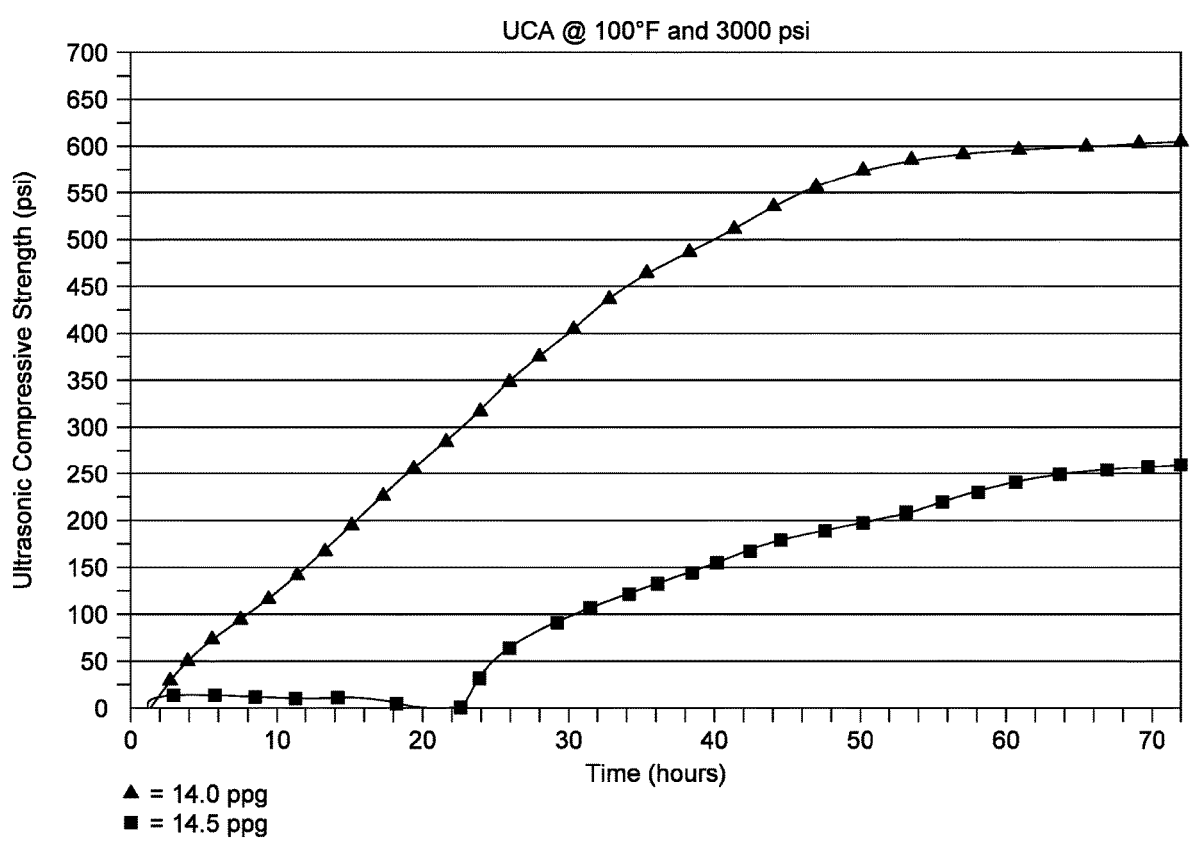
FIG. 10 is a graph showing results of an ultrasonic cement analyzer experiment.

The results in Table 14 illustrate that after ELS-3 is stored the liquid state for extended periods of time, the composition is activatable and develops compressive strength, even down to 70° F. Additionally, this example also illustrates that slurry density can be manipulated to help control slurry set times. FIG. 10 is a graph showing the comparison the 14.0 ppg and 14.5 ppg ultrasonic cement analyzer results at 100° F. It can be observed that the higher density extended life slurry sets faster than the extended life slurry mixed at a lower density.

Example 5

A sample of ELS-2 corresponding to the composition of Table 5 was prepared and tested in an ultrasonic cement analyzer at 250° F. (121° C.) and 3000 psi (20684 kPa).

Figure 11:
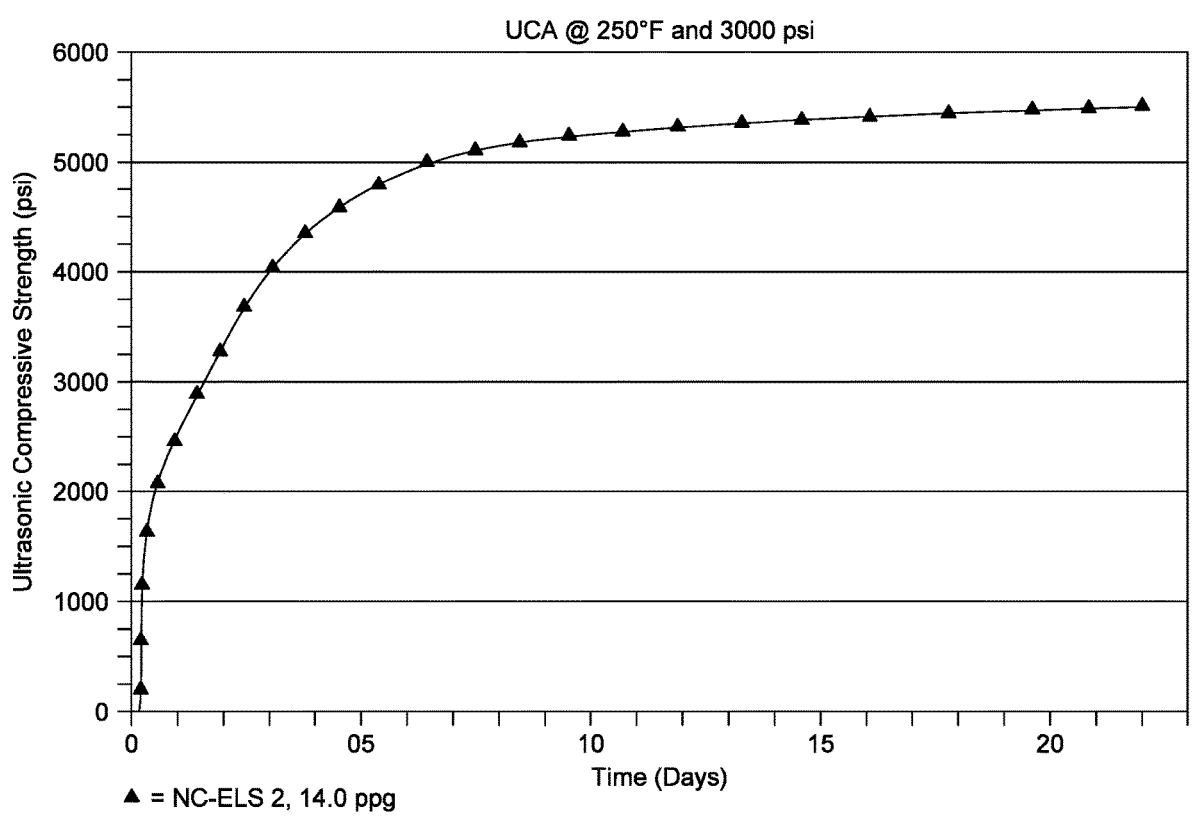
FIG. 11 is a graph showing results of an ultrasonic cement analyzer experiment.

ELS-2 as prepared has a CaO/SiO$_2$ molar ratio of 0.4. The results of the testing of ELS-2 are shown in FIG. 11. It can be observed that ELS-2 is resistant to strength retrogression at temperatures greater than 230° F. (110 C.°) for a period of greater than 22 days.

Example 6

In the previous examples, the extended life slurries prepared did not include enough free lime to fully react with all available pozzolanic material. This example illustrates methods to fully "lime balance" these formulations using different materials. The method used to lime balance these formulations was by determining the silica and calcium content of each cementitious component, such as by x-ray fluorescence for example, and adjusting the amounts to reach a total ratio of nominally 80 wt % silica to 20 wt % calcium oxide. The first example of lime balancing was performed by adding hydrated lime to an ELS-4 formulation as in Table 15 until a 5:1 silica to calcium oxide ratio was achieved. The slurry prepared may be referred to as ELS-4 below.

TABLE 15

| Material | % BWOC |
| --- | --- |
| Class H cement | 20 |
| Class F Fly Ash | 50 |
| Natural Glass | 30 |
| Hydrated Lime | 5.04 |
| Defoamer | 0.17 |
| Water | 37.8 |
| Lignosulfonate Retarder | 0.42 |
| Suspending Agent | 0.02 |

The slurry was mixed and stored in quiescent storage and the rheology was measured daily. However, on day 2 the cement slurry had hardened. The shortened shelf life of this formulation is believed to be due to increased reactivity from lime balancing and a longer shelf life may be achieved by adjusting the retarder concentration to compensate for the additional lime. The rheology of ELS-4 is shown in Table 16.

TABLE 16

| | Viscometer RPM | | | | | | | Apparent Viscosity at |
| --- | --- | --- | --- | --- | --- | --- | --- | --- |
| Age | 3 | 6 | 30 | 60 | 100 | 200 | 300 | 170 1/sec (cP) |
| 0 | 23 | 27 | 52 | 79 | 109 | 179 | 246 | 327 |
| 1 | 38 | 43 | 88 | 113 | 133 | 188 | 241 | 399 |

Figure 12:
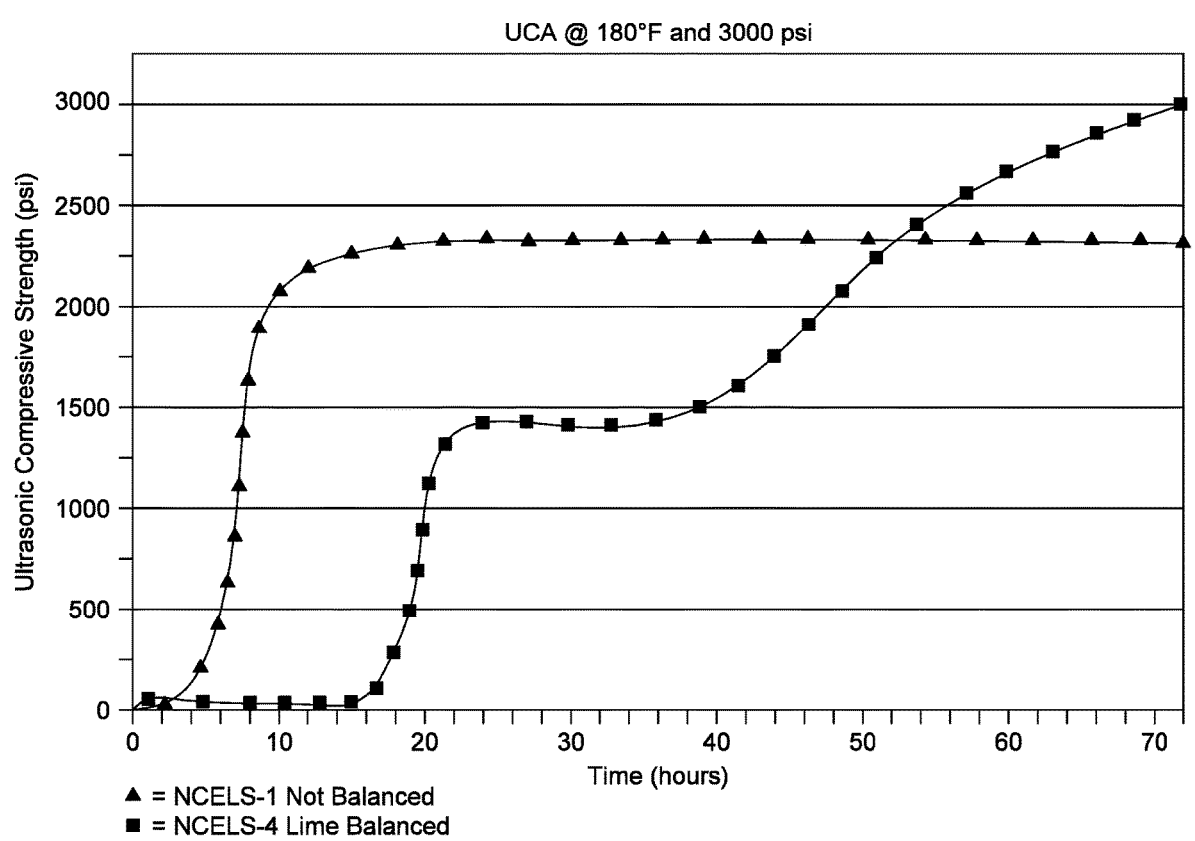
FIG. 12 is a graph showing results of an ultrasonic cement analyzer experiment.

Ultrasonic cement analysis was performed on the prepared slurry at 180° F. (82° C.) and 3000 psi (20684 kPa). FIG. 12 is a graph of a comparison between lime balanced ELS-4 and non-balanced ELS-1 It can be observed that the ultimate compressive strength is lower for the lime balanced slurry as compared to the non-balanced slurry and the lime balanced slurry reached 50 psi approximately 81% quicker than the non-balanced slurry.

Figure 13:
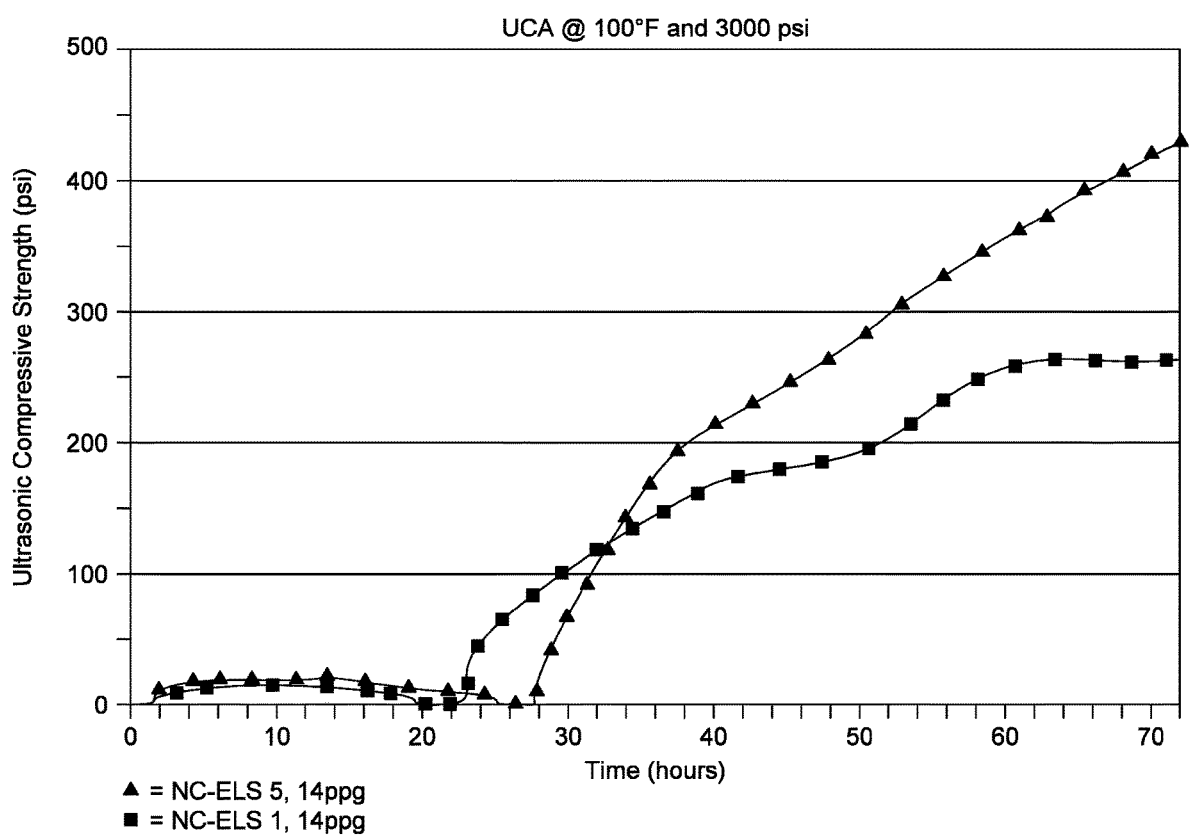
FIG. 13 is a graph showing results of an ultrasonic cement analyzer experiment.

A separate extended-life slurry was prepared using class C fly ash which has a greater lime content than class F fly ash to balance the silica to lime ratio to approximately 5:1. The formulation was prepared according to Table 17. The slurry may be referred to as ELS-5 below. Rheology was measured for the slurry and the results thereof are shown in Table 18 and thereafter subjected to ultrasonic cement testing. FIG. 13 is a graph comparing UCA testing of ELS-5 which utilized a Class C Fly Ash to lime balance the formulation and ELS-1 which utilized a Class F Fly Ash and was not lime balanced. The UCA testing of FIG. 13 was performed at 100° F. (37.8° C.) and 3000 psi (20684 kPa). Although initial set occurred later with ELS-5, it was observed that ELS-5 rapidly gained compressive strength and outperformed ELS-1 beginning at around 34 hours.

TABLE 17

| Material | % BWOC |
| --- | --- |
| Class H cement | 19.8 |
| Class C Fly Ash | 43.2 |
| Natural Glass | 37 |
| Defoamer | 0.2 |
| Water | 53.6 |
| Lignosulfonate Retarder | 2.6 |
| Suspending Agent | 0.04 |

TABLE 18

| | Viscometer RPM | | | | | | | Apparent Viscosity at |
| --- | --- | --- | --- | --- | --- | --- | --- | --- |
| Age | 3 | 6 | 30 | 60 | 100 | 200 | 300 | 170 1/sec (cP) |
| 0 | 4 | 5 | 13 | 22 | 32 | 55 | 78 | 96 |
| 1 | 19 | 24 | 55 | 88 | 122 | 189 | 249 | 366 |

Example 7

Figure 14:
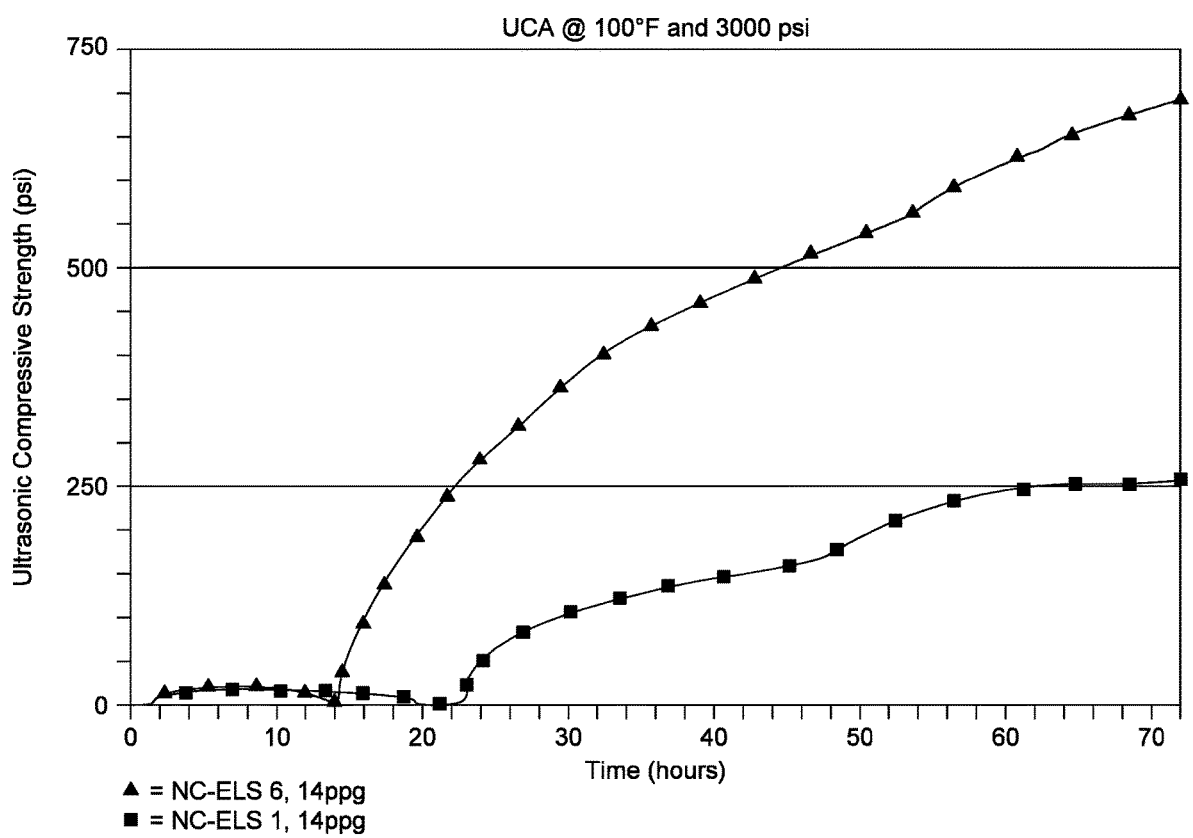
FIG. 14 is a graph showing results of an ultrasonic cement analyzer experiment

This example illustrates that larger amounts of Portland cement, such as up to about 50% by weight, can be utilized to formulate an extended life slurry and at the same time achieve a lime balanced silica to lime ratio. An extended life slurry was prepared according to Table 19. The slurry may be referred to as ELS-6 below. Rheology was measured for the slurry and the results thereof are shown in Table 20 and thereafter subjected to ultrasonic cement testing. FIG. 6 shows the comparison between the ELS-6 formulation with increased amount of Portland cement to reach a lime balance at the 5:1 ratio and the un-balanced ELS-1 formulation at 100° F. (37.8° C.) and 3000 psi (20684 kPa). It can be observer that the higher Portland cement content in ELS-6 increased both the activation and the reactivity of the formulation due to the shift in set time and acceleration of set time. As seen in FIG. 14, the initial set of ELS-6 occurred 8 hours before the initial set of ELS-1. Additionally, the ultimate compressive strength of ELS 5 is markedly higher than ELS 1.

TABLE 19

| Material | % BWOC |
| --- | --- |
| Class H cement | 42.8 |
| Class C Fly Ash | 35.8 |
| Natural Glass | 21.5 |
| Defoamer | 0.15 |
| Water | 51.9 |
| Lignosulfonate Retarder | 0.5 |
| Suspending Agent | 0.06 |

TABLE 18

| | Viscometer RPM | | | | | | | Apparent Viscosity at |
|---|---|---|---|---|---|---|---|---|
| Age | 3 | 6 | 30 | 60 | 100 | 200 | 300 | 170 1/sec (cP) |
| 0 | 0 | 9 | 18 | 29 | 40 | 67 | 94 | 120 |
| 1 | 10 | 13 | 27 | 42 | 59 | 96 | 131 | 177 |
| 10 | 22 | 25 | 38 | 56 | 83 | 125 | 168 | 249 |

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of preparing a cement comprising:
   defining one or more engineering parameters of a proposed cement slurry, wherein the one or more engineering parameters comprise wellbore temperature, required compressive strength, and a gelling requirement;
   selecting at least:
      a cement and mass fraction thereof and at least one supplementary cementitious material and mass fraction thereof, wherein the step of selecting a cement and mass fraction thereof and at least one supplementary cementitious material and mass fraction thereof comprises:
      (a) selecting a first cement based at least in part on the wellbore temperature and a cement reactivity trend, wherein the cement reactivity trend comprises a correlation of cement reactivity with temperature;
      (b) selecting at least a first supplementary cementitious material based at least in part on wellbore temperature, each supplementary cementitious material reactivity, temperature sensitivity of reactivity, and water requirement of each supplementary cementitious material;
      (c) calculating a silica content and a lime content for each of the first cement and each supplementary cementitious material and determining an additional amount of lime required based at least in part on a shelf life requirement;
      (d) preparing a first test slurry comprising the first cement and each supplementary cementitious material;
      (e) testing the prepared first test slurry to determine a first compressive strength and a first gelling rate;
      (f) comparing the first compressive strength to the required compressive strength and the first gelling rate to the gelling requirement and determining if the first compressive strength and the first gelling rate meet the required compressive strength and the gelling requirement; and
      (g) performing steps (a)-(f) with a second cement if the first compressive strength and the first gelling rate do not meet the required compressive strength and the gelling requirement, where the second cement has a different chemical identity than the first cement, or selecting the first cement if the first compressive strength and the first gelling rate meet the required compressive strength and the gelling requirement;
   a retarder and mass fraction thereof; and
   a water and mass fraction thereof, such that a slurry formed from the cement, the at least one supplementary cementitious material, the retarder, and the water meets at least one of the one or more engineering parameters and has a property of being capable of remaining in a pumpable fluid state for a period of about 1 day or greater at a temperature of about 80° F. in quiescent storage; and
   preparing the slurry.

2. The method of claim 1 wherein the cement is selected from the group consisting of Portland cements, pozzolana cements, gypsum cements, high alumina content cements, silica cements, and combinations thereof.

3. The method of claim 1 wherein the at least one supplementary cementitious material is selected from the group consisting of fly ash, blast furnace slag, silica fume, pozzolans, kiln dust, clays, and combinations thereof.

4. The method of claim 1 wherein the one or more engineering parameters comprise shelf-life time requirement and rate of gelling requirement and wherein the step of selecting a retarder and mass fraction thereof comprises:
   (a) selecting a first retarder based at least in part on the shelf-life time requirement and rate of gelling requirement;
   (b) preparing a plurality of cement slurries comprising the cement, the at least one supplementary cementitious material, and the first retarder, wherein the plurality of cement slurries each comprise the first retarder in disparate quantities;
(c) monitoring the plurality of cement slurries for flowability and rate of gelling;
(d) comparing the flowability and rate of gelling of the plurality of cement slurries to the shelf-life time requirement and the rate of gelling requirement and determining if the flowability and rate of gelling meet the shelf-life time requirement and the rate of gelling requirement; and
(e) performing steps (a)-(d) with a second retarder if the flowability and rate of gelling do not meet the shelf-life time requirement and the rate of gelling requirement, wherein the second retarder has a different chemical identity than the first retarder, or selecting the first retarder and a quantity of the first retarder if the flowability and rate of gelling meet the shelf-life time requirement and the rate of gelling requirement.

5. The method of claim 4 wherein the one or more engineering parameters further comprise wellbore temperature and wherein the method further comprises adjusting rheological stability, wherein adjusting rheological stability comprises:
(f) selecting a first viscosifier, a first dispersant, or a combination thereof based at least in part on the flowability and rate of gelling from step (c), wellbore temperature, and water requirement of the cement and the at least one supplementary cementitious material;
(g) preparing a second plurality of cement slurries comprising the cement, the at least one supplementary cementitious material, the selected retarder from step (e), and the selected first viscosifier, the first dispersant, or a combination thereof wherein the plurality of cement slurries each comprise the first viscosifier, the first dispersant, or a combination thereof in disparate quantities;
(h) monitoring the second plurality of cement slurries rate of gelling;
(i) comparing the rate of gelling of the second plurality of cement slurries to the rate of gelling requirement and determining if the rate of gelling meet the rate of gelling requirement; and
(j) performing steps (f)-(i) with a second viscosifier, a second dispersant, or a combination thereof if the rate of gelling do not meet the rate of gelling requirement, wherein the second viscosifier, second dispersant, or both the second viscosifier and the second dispersant have a different chemical identity than the first viscosifier and first dispersant, or selecting the first viscosifier, the first dispersant, or both the first viscosifier and the first dispersant and a quantity of the first viscosifier and the first dispersant if the rate of gelling meet the rate of gelling requirement.

6. The method of claim 5 wherein the one or more engineering parameters further comprise a thickening time requirement, a compressive strength requirement, a required density, and a wellbore pressure and wherein the method further comprises:
(k) preparing a third cement slurry comprising the cement, the at least one supplementary cementitious material, the selected retarder from step (e), and the selected viscosifier, the selected first dispersant, or a combination thereof from step (j) and water in a sufficient amount such that the slurry has a density of approximately the required density;
(l) curing the third cement slurry at or above the wellbore pressure and temperature and monitoring thickening time and compressive strength of the third cement slurry;
(m) comparing the thickening time and compressive strength of the third cement slurry to the compressive strength requirement and thickening time requirement; and
(n) determining if an activator or additional retarder is required based at least in part on step (m) and selecting an activator if an activator is required.

7. The method of claim 6 wherein the step of determining if an activator is required comprises:
(o) comparing the thickening time and compressive strength of the third cement slurry to the compressive strength requirement and thickening time requirement; and
(p) selecting a first activator based at least in part on temperature and reactivity of the activator;
(q) preparing a fourth cement slurry comprising the cement, the at least one supplementary cementitious material, the selected retarder from step (e), and the selected viscosifier, the selected dispersant, or a combination thereof from step (j), water in a sufficient amount such that the slurry has a density of approximately the required density, and the first activator;
(r) curing the fourth cement slurry at or above the wellbore pressure and temperature and monitoring thickening time and compressive strength of the fourth cement slurry;
(s) comparing the thickening time and compressive strength of the fourth cement slurry to the compressive strength requirement and thickening time requirement; and
(t) performing steps (o)-(s) with a second activator if the thickening time and compressive strength of the fourth slurry do not meet the compressive strength requirement and thickening time requirement, wherein the second activator has a different chemical identity than the first activator.

8. The method of claim 6 wherein the step of determining if additional retarder is required comprises:
(o) comparing the thickening time and compressive strength of the third cement slurry to the compressive strength requirement and thickening time requirement; and
(p) selecting a first additional retarder based at least in part on temperature and reactivity of the retarder;
(q) preparing a fifth cement slurry comprising the cement, the at least one supplementary cementitious material, the selected retarder from step (e), and the selected viscosifier, the selected dispersant, or a combination thereof from step (j), water in a sufficient amount such that the slurry has a density of approximately the required density, and the first additional retarder;
(r) curing the fifth slurry at or above the wellbore pressure and temperature and monitoring thickening time and compressive strength of the fifth cement slurry;
(s) comparing the thickening time and compressive strength of the fifth cement slurry to the compressive strength requirement and thickening time requirement; and
(t) performing steps (o)-(s) with a second additional retarder if the thickening time and compressive strength of the fifth slurry do not meet the compressive strength requirement and thickening time requirement, wherein the second additional retarder has a different chemical identity than the first additional retarder.

9. A method comprising:
defining one or more engineering parameters of a proposed cement slurry, wherein the one or more engineering parameters comprise wellbore temperature, required compressive strength, and a gelling requirement;
selecting a cement and mass fraction thereof and a supplementary cementitious material and mass fraction thereof that would provide the proposed cement slurry that meets the one or more engineering parameters, wherein the step of selecting a cement and mass fraction thereof and at least one supplementary cementitious material and mass fraction thereof comprises:
  (a) selecting a first cement based at least in part on the wellbore temperature and a cement reactivity trend, wherein the cement reactivity trend comprises a correlation of cement reactivity with temperature;
  (b) selecting at least a first supplementary cementitious material based at least in part on wellbore temperature, each supplementary cementitious material reactivity, temperature sensitivity of reactivity, and water requirement of each supplementary cementitious material;
  (c) calculating a silica content and a lime content for each of the first cement and each supplementary cementitious material and determining an additional amount of lime required based at least in part on a shelf life requirement;
  (d) preparing a first test slurry comprising the first cement and each supplementary cementitious material;
  (e) testing the prepared first test slurry to determine a first compressive strength and a first gelling rate;
  (f) comparing the first compressive strength to the required compressive strength and the first gelling rate to the gelling requirement and determining if the first compressive strength and the first gelling rate meet the required compressive strength and the gelling requirement; and
  (g) performing steps (a)-(f) with a second cement if the first compressive strength and the first gelling rate do not meet the required compressive strength and the gelling requirement, where the second cement has a different chemical identity than the first cement, or selecting the first cement if the first compressive strength and the first gelling rate meet the required compressive strength and the gelling requirement;
selecting a retarder that would provide the proposed cement slurry that meets the one or more engineering parameters; and
preparing a slurry comprising the cement, the supplementary cementitious material, and the retarder, wherein the slurry comprises the cement in an amount of 50% or less, wherein the slurry meets at the one or more engineering parameters, and wherein the slurry has a property of being capable of remaining in a pumpable fluid state for a period of about 1 day or greater at a temperature of about 80° F. in quiescent storage.

10. The method of claim 9 wherein the cement is selected from the group consisting of Portland cements, pozzolana cements, gypsum cements, high alumina content cements, silica cements, and combinations thereof.

11. The method of claim 9 wherein the supplementary cementitious material is selected from the group consisting of fly ash, blast furnace slag, silica fume, pozzolans, kiln dust, clays, and combinations thereof.

12. The method of claim 9 wherein the at least one engineering parameter comprises compressive strength requirement and rate of gelling requirement and wherein the step of selecting the retarder comprises selecting a retarder such that the prepared slurry comprising the retarder meets the compressive strength requirement and a gelling requirement.

13. The method of claim 9 wherein the at least one engineering parameter comprises a flowability requirement and rate of gelling requirement, wherein the method further comprises selecting a viscosifier, wherein the viscosifier is included in the prepared slurry, and wherein the step of selecting the viscosifier comprises selecting a viscosifier such that the prepared slurry comprising the viscosifier meets the flowability requirement and rate of gelling requirement.

14. The method of claim 9 wherein the at least one engineering parameter comprises a flowability requirement and rate of gelling requirement, wherein the method further comprises selecting a dispersant, wherein the dispersant is included in the prepared slurry, and wherein the step of selecting the dispersant comprises selecting a dispersant such that the prepared slurry comprising the dispersant meets the flowability requirement and rate of gelling requirement.

15. The method of claim 9 wherein the at least one engineering parameter comprises a thickening time requirement and a compressive strength requirement, wherein the method further comprises selecting an activator, wherein the activator is included in the prepared slurry, and wherein the step of selecting the activator comprises selecting an activator such that the prepared slurry comprising the activator meets the thickening time requirement and a compressive strength requirement.

16. The method of claim 15 wherein the cement slurry is prepared by:
  combining the cement, the supplementary cementitious material, the retarder, and water to form the cement slurry;
  storing the cement slurry for a period of about 1 day or greater; and
  combining the activator with the cement slurry to form an activated cement slurry.

17. The method of claim 16 further comprising placing the cement slurry in a subterranean formation.

* * * * *